US012770764B2

(12) United States Patent
Agee et al.

(10) Patent No.: US 12,770,764 B2
(45) Date of Patent: Oct. 20, 2026

(54) MODULAR RESISTOR GRID TO ACHIEVE "BLACK BOX" RESISTANCE

(71) Applicant: Caterpillar Inc., Peoria, IL (US)

(72) Inventors: Dennis Christopher Agee, Newark, TX (US); Drew Devlin Carlton, Peoria, IL (US); Jacob Dean Randall, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 508 days.

(21) Appl. No.: 18/507,792

(22) Filed: Nov. 13, 2023

(65) Prior Publication Data

US 2025/0157706 A1 May 15, 2025

(51) Int. Cl.
*H01C 13/02* (2006.01)
*H01C 1/02* (2006.01)
*H01C 17/00* (2006.01)

(52) U.S. Cl.
CPC ............... *H01C 13/02* (2013.01); *H01C 1/02* (2013.01); *H01C 17/00* (2013.01)

(58) Field of Classification Search
CPC .......... H01C 13/02; H01C 1/01; H01C 1/082; H01C 17/00
See application file for complete search history.

(56) References Cited

U.S. PATENT DOCUMENTS 3,550,058 A 12/1970 Bois, Jr.
4,654,627 A * 3/1987 Harkness ................. H01C 3/10 338/319
4,847,585 A * 7/1989 Kirilloff ................... H01C 3/10 338/58
5,159,310 A * 10/1992 Cummins ................ H01C 1/08 338/290
5,304,978 A 4/1994 Cummins et al.
8,692,647 B2 4/2014 Brown et al.
2022/0203839 A1 6/2022 Cooper et al.

FOREIGN PATENT DOCUMENTS

CN 201430037 Y 3/2010
CN 216133724 U 3/2022
JP 06-112005 A 4/1994

* cited by examiner

*Primary Examiner* — Kyung S Lee
(74) *Attorney, Agent, or Firm* — Foley & Lardner LLP

(57) ABSTRACT

Systems, apparatuses, and methods relate to modular resistor grid assemblies having a "black box" resistance. The modular resistor grid assemblies include a first plurality of first resistor plates having a first thickness disposed within a first housing. The first housing has a first input and output terminal. The first resistor plates provide a target electrical resistance between the first input output terminal. A second plurality of second resistor plates having a second thickness smaller than the first thickness is disposed within a second housing. The second housing has a second input and output terminal. The second resistor plates provide the target electrical resistance between the second input and output terminal. The first and second housing interchangeably couple to a resistive braking system. The first plurality includes a first number of first resistor plates, and the second plurality includes a second number of second resistor plates less than the first number.

20 Claims, 13 Drawing Sheets

MODULAR RESISTOR GRID TO ACHIEVE "BLACK BOX" RESISTANCE

TECHNICAL FIELD

The present disclosure relates generally to a modular resistor grid system that includes a modular resistor grid assembly, such as a resistor grid assembly used for resistive braking in a machine. More specifically, the present disclosure relates to a modular resistor grid system configured to interchangeably receive modular resistor grid assemblies that provide a designated or "black box" resistance. The modular resistor grid assemblies may be formed from multiple modular resistor grids and may have identical or similar electrical resistances between their respective input and output terminals despite having different sizes and different thermodynamic properties. Interchangeably coupling the modular resistor grid assemblies with a target black box resistance to a modular resistor grid system can achieve improved resistive breaking capacity in variable operating environments, among other benefits.

BACKGROUND

Resistor grid systems used for dynamic braking in machines, such as electric and diesel-electric locomotives, off-highway machines, and other heavy equipment, are well known. Typically, the resistor grid system includes a plurality of resistor elements to dissipate the electric power generated during braking of the machine as heat. Thus, the resistor grid system may supplement the friction-based brakes and minimize the wear in friction-based braking components of the machine. However, the ability of a resistor grid system to dissipate heat may be reduced based on the component design of the system, ambient conditions surrounding the machine, and the altitude of machine operation. Improved resistor grid system designs are needed to increase the longevity of resistive braking systems and to allow for maximum braking capacity under varied operating conditions.

Further, existing resistor grid systems operate in environments prone to extreme conditions such as inclement weather, rain, exposure to dust and debris, and the like. Accordingly, wet conditions may lead to DC ground faults and other shortages which reduce resistive breaking capacity. Further, current resistor grid systems fail to account for variations in machine operating conditions. Changes in altitude and corresponding changes in air density, for example, may reduce the resistive breaking capacity of current resistive braking systems due to their inability to adapt based on the target operating locale or based on changes in ambient operating conditions.

SUMMARY

One embodiment relates to a modular resistor grid assembly. The modular resistor grid assembly includes an input terminal, an output terminal, a first plurality of resistor grids configured to couple together, and a second plurality of resistor grids configured to couple together. The first plurality of resistor grids, when coupled together, and the second plurality of resistor grids, when coupled together, are configured to interchangeably connect to the input terminal and the output terminal. When the first plurality of resistor grids connects to the input terminal and the output terminal, the first plurality of resistor grids provides a target electrical resistance between the input terminal and the output terminal. Similarly, when the second plurality of resistor grids connects to the input terminal and the output terminal, the second plurality of resistor grids also provides the target electrical resistance between the input terminal and the output terminal. Each of the first plurality of resistor grids includes a first housing and a first plurality of resistor plates disposed within the first housing. Each of the first plurality of resistor plates has a first thickness. Similarly, each of the second plurality of resistor grids includes a second housing and a second plurality of resistor plates disposed within the second housing. Each of the second plurality of resistor plates has a second thickness. Further, the first thickness is greater than the second thickness.

Another embodiment relates to a modular resistor grid assembly. The modular resistor grid assembly includes a first plurality of resistor plates disposed within a first housing. Each of the first plurality of resistor plates has a first thickness. The first housing has a first input terminal and a first output terminal. The first plurality of resistor plates is configured to provide a target electrical resistance between the first input terminal and the first output terminal. The modular resistor grid assembly also includes a second plurality of resistor plates disposed within a second housing. Each of the second plurality of resistor plates has a second thickness. The second housing has a second input terminal and a second output terminal. The second plurality of resistor plates is configured to provide the target electrical resistance between the second input terminal and the second output terminal. Further, the first housing and the second housing are configured interchangeably couple to a resistive braking system of a machine. Additionally, the first plurality of resistor plates includes a first number of resistor plates, and the second plurality of resistor plates includes a second number of resistor plates less than the first number of resistor plates. Finally, the first thickness of the first plurality of resistor plates is greater than the second thickness of the second plurality of resistor plates.

Still another embodiment relates to a method of using a modular resistor grid assembly. The method includes installing a first modular resistor grid assembly to a resistive braking system of a vehicle by coupling an input terminal and an output terminal of the first modular resistor grid assembly to the resistive braking system such that a target electrical resistance and a first watt density are defined between the input terminal and the output terminal. The method also includes operating the vehicle at a first location and moving the vehicle to a second location. The method further includes uninstalling the first modular resistor grid assembly from the resistive braking system by decoupling the input terminal and the output terminal of the first modular resistor grid assembly from the resistive braking system. Additionally, the method includes installing a second modular resistor grid assembly to the resistive braking system of the vehicle by coupling an input terminal and an output terminal of the second modular resistor grid assembly to the resistive braking system such that the target electrical resistance and a second watt density, greater than the first watt density, are defined between the input terminal and the output terminal. Finally, the method includes operating the vehicle at the second location.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
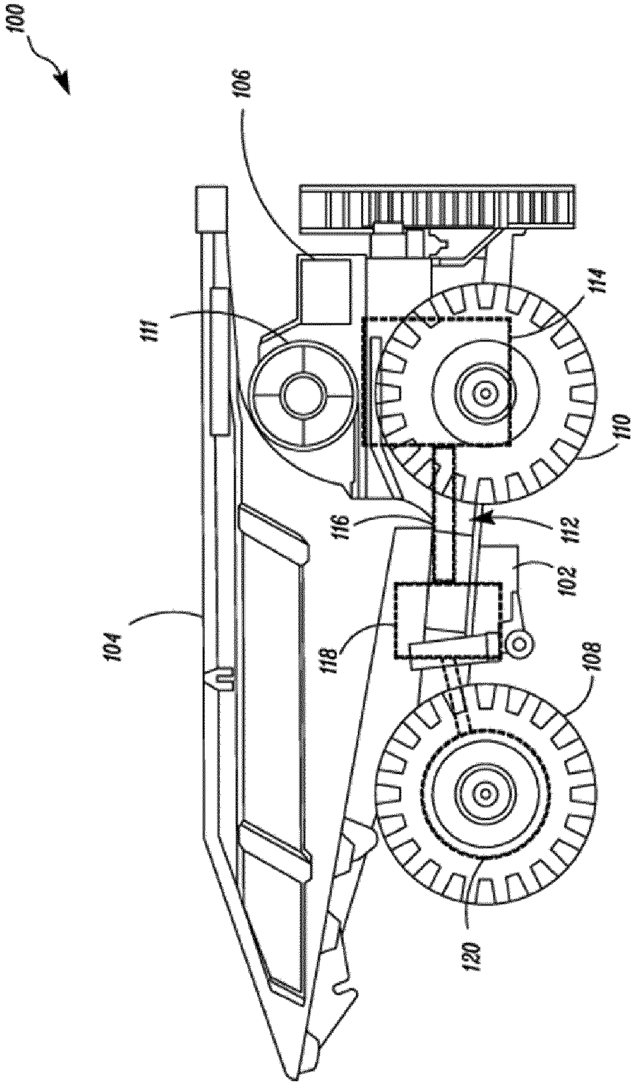
FIG. 1 illustrates a side view of a machine, according to an aspect of the present disclosure.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The modular resistor grid systems including modular resistor grid assemblies having a "black box" resistance disclosed herein can interchangeably vary in thermodynamic properties and system size while providing uniform resistive breaking capacity to suit their environment of operation. In some aspects, the descriptor "black box" resistance illustrates that, from a systems or circuit perspective, the modular resistor grid assemblies disclosed herein may be connected between an input and an output and create identical resistances across the input and the output. For illustrative purposes, a first modular resistor grid assembly may have a resistance of 3 Ohms. A second modular resistor assembly may also have a resistance of 3 Ohms but have differing physical and thermodynamic properties than the first modular resistor grid assembly. However, a resistance measurement across the input and output terminal would yield only a reading of 3 Ohms for each despite these differences. In this way, despite the varying physical and thermodynamic properties, each of the plurality of modular resistor grid assemblies disclosed herein may be treated as a "black box" having a shared resistance value that enables interoperability with a modular resistor grid system.

According to an exemplary embodiment, a modular resistor assembly is configured to interchangeably, electrically couple to an input terminal and an output terminal of a machine (e.g., to an input terminal and an output terminal of a resistive braking system of a machine). In other words, one modular resistor assembly having a "black box" resistance may be removed from the machine's input terminal and output terminal, and a second modular resistor assembly having the "black box" resistance may be electrically coupled to the input terminal and the output terminal. Advantageously, in response to or in anticipation of changes in the machine's operating environment, the modular resistor assembly having a "black box" resistance may be exchanged or swapped for a different modular resistor assembly that provides different physical and thermodynamic properties but similar electrical properties and specifically an identical "black box" resistance between the input terminal and output terminal. In this way, the modular resistor assemblies having a "black box" resistance allow for a machine or a resistive braking system thereof to interchangeably adapt to changes in operating conditions without sacrificing resistive breaking capacity and with minimal changes to system architecture.

For example, and as discussed herein, multiple modular resistor grid assemblies having a "black box" resistance for a modular resistor grid system are disclosed. Each modular resistor grid assembly may include an input terminal, an output terminal, a housing, and one or more modular resistor grids. Specifically, multiple modular resistor grids may couple together to form a modular resistor grid assembly having a "black box" resistance. The modular resistor grids, in turn, include terminals, a housing, and resistor elements disposed within the housing. The resistor elements may be disposed in rows within the housing and may be connected in series or in parallel to form a conductive path between the terminals. When the modular resistor grids couple together, they form respective modular resistor grid assemblies having a "black box" resistance. In this way, by varying the structural and geometric properties of the resistor elements and associated resistor grid assemblies and components thereof, modular resistor grid assemblies of varying sizes, masses, and thermodynamic properties can interchangeably couple to the input terminal and the output terminal of a resistive braking system while the electrical resistance between the input terminal and output terminal remains the same. Further, the resistor elements may be composed of a resistor plate and insulators. By varying the number and thickness of the resistor plates, the watt-density, size, and surface area exposed for convective heat transfer associated with varied modular resistor grid assemblies having a "black box" resistance may be coupled to the resistive braking system of a machine to avoid losses to resistive breaking capacity due to changes in the environment of operation.

Specifically, the modular resistor grid assemblies having a "black box" resistance may vary in (i) the number of resistor plates disposed within their housings, (ii) the thickness and/or width of the resistor plates disposed within their housings, and (iii) the axial length of their housings. Further, a first modular resistor grid assembly and a second modular resistor grid assembly may vary in (iv) respective watt-densities of the modular resistor grid assemblies, (v) a number of modular resistor grids coupled together to form the respective modular resistor grid assemblies, and (vi) a number of resistor rows disposed within the respective modular resistor grid assemblies. Also, the first modular resistor grid assembly and the second modular resistor grid assembly may be similar and share at least one or more of (i) the same target resistance between the input terminal and the output terminal, (ii) the same radial height (e.g., size of an inner radius of the housing and/or size of the outer radius of the housing, and (iii) the general profile/form and structure of insulators within each respective housing such that the insulators may be manufactured utilizing the same base processes. Beneficially, the interchangeable quality of the modular resistor grid assemblies having a "black box" resistance and the similarities in form and structure allow for common insulator tooling, common resistor element tooling, common cooling fan (e.g., blower) assemblies, and common mounting features (e.g., frames, fan mounts, and the like) to be used across a fleet of machines. Common tooling and overlapping structural components save costs associated with fabrication, assembly, installation, and use of the modular resistor grid system.

Additionally, the "black box resistance" shared by the modular resistor grid assemblies allows for each of the plurality of modular resistor grid assemblies to variability and interchangeability couple to a modular resistor grid system of a vehicle as needed (e.g., for a specific operating environment, a modular resistor grid assembly having a particular geometry suited for the environment may be chosen and installed, and the vehicle resistive breaking systems will compatibly operate with the modular resistor grid assembly due to the shared electrical properties between one modular resistor grid assembly and another). Beneficially, and in short, providing modular resistor grid assemblies with a "black box" resistance allows for various modular resistor grid assemblies to be interchanged in a modular resistor grid system of a machine to suit changes in the machine's environment of operation. For example, at high altitudes, air density is lower than air density at lower altitudes. Accordingly, a machine operating a fan to cool a modular resistor grid assembly will provide equal volumetric flow rates of cooling air at both altitudes, however the mass flow rate of air through the high-altitude modular resistor grid assembly may be substantially less than the mass flow rate of air through the low altitude modular resistor grid assembly due to the difference in air density. Accordingly, a machine would benefit from including a modular resistor grid assembly having a lower watt-density of power dissipation and a larger axial length (e.g., surface area for heat convection) at the high-altitude location. Similarly, the machine at the lower altitude location would benefit from having a higher-watt density of power dissipation and a smaller axial length (e.g., surface area for heat convection) to achieve the same restive braking capacity while reducing machine mass and occupied space.

The apparatuses, systems, and methods disclosed herein allow for interchangeable adaptation of resistive breaking assemblies to optimize physical, electrical, and thermodynamic properties of a machine's resistive braking system based on such changes to the machine's operating environment. Further, although the interchangeable modular resistive grid assemblies having a "black box" resistance may vary in watt-density, mass, surface area for heat dissipation, and the like, they may in some respects be treated the same from systems perspective. For example, and beneficially, a resistance across the input and output terminals of different modular resistor grid assemblies having a "black box" resistance would be the same, allowing for vehicle control systems and circuits to operate with the interchangeable modular resistor grid assemblies with little to no adjustment or calibration.

Exemplary Electric Drive Machine

A machine 100 in which disclosed embodiments may be implemented is schematically illustrated in FIG. 1. The machine 100 may be generically described as any machine having an electric drive which may be connected to one or more drive wheels. The machine 100 may include a vehicle such as a diesel engine locomotive, a subway tram, an off-highway truck or a vehicle used in mining, construction, quarrying, and other applications. However, it will be apparent, any other vehicle having an electric drive or an electric-only arrangement may be included in the machine 100.

For the purpose of the present disclosure, in FIG. 1, the machine 100 is illustrated as an off-highway truck. The machine 100 may include a chassis 102 to support various components of the machine 100. The machine 100 may include a dump body 104 supported on the chassis 102. The chassis 102 may further support an operator cab 106 defined as an enclosure. An operator occupying the operator cab 106 may control various functions of the machine 100 by issuing various operator commands by means of controls such as a joystick, a lever, a touch-based user interface, or the like.

The machine 100 may further include a set of drive wheels 108 to propel the machine 100. In an embodiment, a set of idle wheels 110 may also be provided to steer the machine 100 in different directions. Further, the machine 100 may also include an articulated chassis for steering. Together, the set of drive wheels 108 and the set of idle wheels 110 may act as the ground engaging members for the machine 100. As illustrated in FIG. 1, the machine 100 also includes a modular resistor grid system 111 positioned adjacent to the operator cab 106 in the machine 100. However, it may be apparent, the modular resistor grid system 111 may be positioned anywhere based on the design and the available space in the machine 100.

The machine 100 of the present disclosure may be an electric machine having an electric drive 112. The electric drive 112 may provide the electric power to drive various components in the machine 100. In an embodiment, the electric power may be generated onboard by a generator, alternator, or another power-generation device, which may be driven by an engine or any other power source. Alternatively, the electric power may not be generated onboard but supplied externally from an overhead conductor via a pantograph trolley, a battery, a series of capacitors, or the like to drive the machine 100.

In the illustrated embodiment, the electric drive 112 includes a power source 114, which may be an engine, for example, an internal combustion engine such as a diesel engine, a gasoline engine, a natural gas engine or the like. The power source 114 may provide an output torque at an output shaft 116 in the machine 100. The output shaft 116 may be connected to a generator 118, which may be a multiple-phase alternating current (AC) synchronous alternator. During operation, the output shaft 116 rotates a rotor of the generator 118 to produce electric power, for example, in the form of alternating current (AC). This generated electric power may be used to run a plurality of drive motors 120 coupled directly or via intermediate assemblies to the set of drive wheels 108. For the purpose of the present disclosure, the drive motors 120 may be variable speed, reversible AC motors.

Exemplary Electric Drive and Dynamic Braking System

Figure 2:
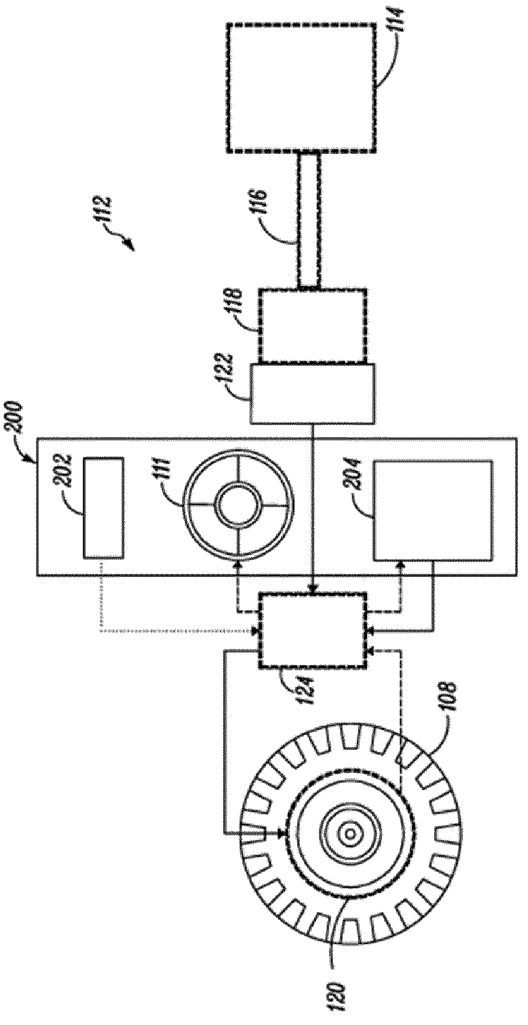
FIG. 2 illustrates a schematic diagram of an electric drive for the machine of FIG. 1.

A schematic of the electric drive 112 is illustrated in FIG. 2. The electric drive 112 of the present disclosure may be a direct series drive. FIG. 2 illustrates an exemplary arrangement of various components of the electric drive 112 in the machine 100. In the schematic diagram, the flow direction of the electric power in the system is denoted by arrows. The solid-lined arrows denote the flow of the electric power when the machine 100 is being propelled. Conversely, the flow of the electric power during a braking mode of the machine 100 is denoted by dash-lined arrows in FIG. 2. While the dotted line arrow designates control line connection between components of the electric drive 112.

A person skilled in the art will understand that the generator 118 may produce electric power in the form of alternating current (AC) power. This electric power may be supplied to a rectifier 122 and converted to direct current (DC) power. The rectified DC power may be converted again to AC power by an inverter circuit 124. The inverter circuit 124 may be capable of selectively adjusting the frequency and/or pulse-width of the output, such that the drive motors 120 that are connected to an output of the inverter circuit 124 may be operated at variable speeds. In an embodiment, a plurality of inverter circuits 124 may be disposed in connection with the drive motors 120 in the machine 100.

FIG. 2 further illustrates a dynamic braking system 200 for the machine 100. The dynamic braking system 200 may be in connection with the drive motors 120 of the machine 100. Specifically, the dynamic braking system 200 may be operatively disposed in connection with the inverter circuit 124 in the machine 100. The dynamic braking system 200 may be configured to retard the propulsion of the machine 100 during braking mode as per an operator command in the machine 100.

According to the present disclosure, the dynamic braking system 200 may include a control unit 202, which may be a combination of, but not limited to, a set of instructions, a Random Access Memory (RAM), a Read Only Memory (ROM), flash memory, a data structure, and the like. The control unit 202 may be configured to receive the operator command in the machine 100. Further, the control unit 202 may determine whether to put the machine 100 in the braking mode or not, based at least in part on the operator command. To initiate braking of the machine 100, the control unit 202 may generate a braking signal (illustrated by dotted line) for the inverter circuit 124.

The braking signal may be received by the inverter circuit 124 in the machine 100. The braking signal may carry instructions to reverse a torque polarity of the drive motors 120. This makes the drive motors 120 to act as generators, using the mechanical power in the form of rotational energy from the set of drive wheels 108 to produce electric power. This electric power may be supplied back to the electric drive 112 in the machine 100.

The dynamic braking system 200 may further be configured to provide regenerative braking in the machine 100. For this purpose, the dynamic braking system 200 may include an energy storage unit 204. The energy storage unit 204 may include a battery, a plurality of capacitors or the like disposed in connection with the drive motors 120 in the electric drive 112. As during braking mode, the drive motors 120 may produce electric power, the energy storage unit 204 may store this electric power for later use in the machine 100.

The present disclosure is applicable to many machines, for example, a large off-highway truck, such as a dump truck, which are commonly used in mines, construction sites and quarries. The machine 100 may have a high payload capability and a travel speed of a few miles per hour when fully loaded. The machine 100 may further be required to operate in a variety of environments, at a variety of altitudes, and to negotiate steep inclines in dry or wet conditions.

Typically, to halt or slow down such machines, friction-based brakes coupled to the set of drive wheels and idle wheels are used. These friction-based brakes are effective but may wear out with prolonged use. To overcome this, the dynamic braking system 200 of the machine 100 of the present disclosure may work in combination with or without these friction-based brakes. The dynamic braking system 200 may supplement these friction-based brakes in the machine 100 and thus helps in reducing the wear of such brakes.

The dynamic braking system 200 may act on the operator command to put the machine 100 in the braking mode. Specifically, the operator command may be received by the control unit 202 in the dynamic braking system 200. The control unit 202 generates the braking signal determined at least in part by the operator command. This determination or calculation may be based on various operating parameters of the machine 100, such as, the current speed, the current payload, the rate of acceleration, the desired speed and so forth.

Subsequently, the braking signal may be received by the inverter circuit 124 in the electric drive 112 of the machine 100. In the braking mode, the electric drive 112 may switch the torque polarity of the drive motors 120, which makes the drive motors 120 to act as generators. In this mode, the drive motors 120 may use the power from the set of drive wheels 108, which ultimately discharges the mechanical energy of the set of drive wheels 108 and achieves retarding of the machine 100. Further, the drive motors 120, consuming the mechanical power from the set of drive wheels 108, may generate electric power in the electric drive 112.

This generated electric power may be fed to the dynamic braking system 200 in the electric drive 112. The generated electric power, which may be in the form of AC, may be fed via the inverter 124 which converts AC electric power into DC electric power. In an embodiment, with the machine 100 having regenerative braking, a part of the generated electric power may be supplied to the modular resistor grid system 111 to be dissipated as heat and the remainder of the generated electric power may be supplied to the energy storage unit 204 for later use in the machine 100.

Exemplary Components and Configuration of a Modular Resistor Grid System

Figure 3:
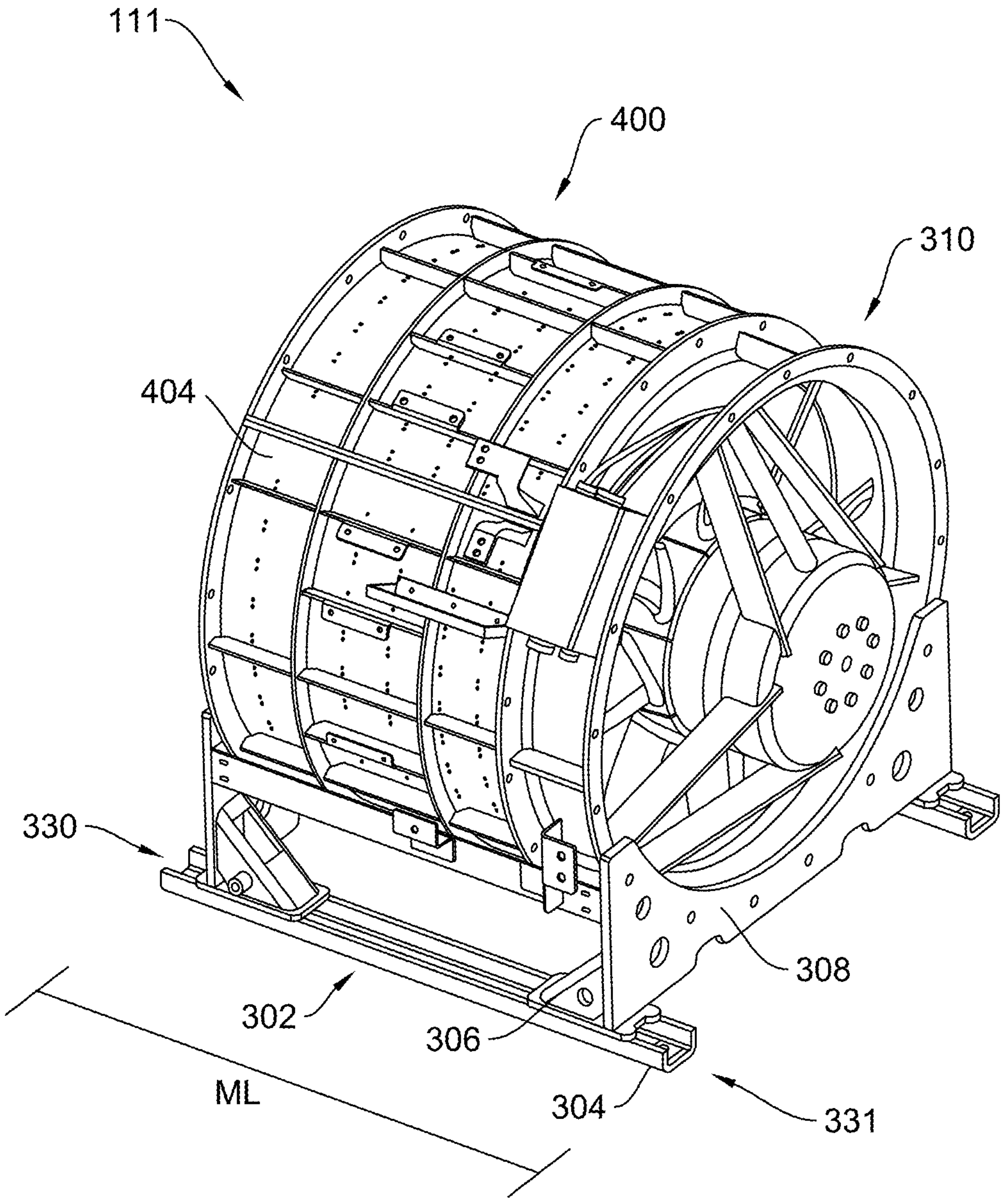
FIG. 3 illustrates a perspective view of one configuration of a modular resistor grid system and components thereof.
Figure 4:
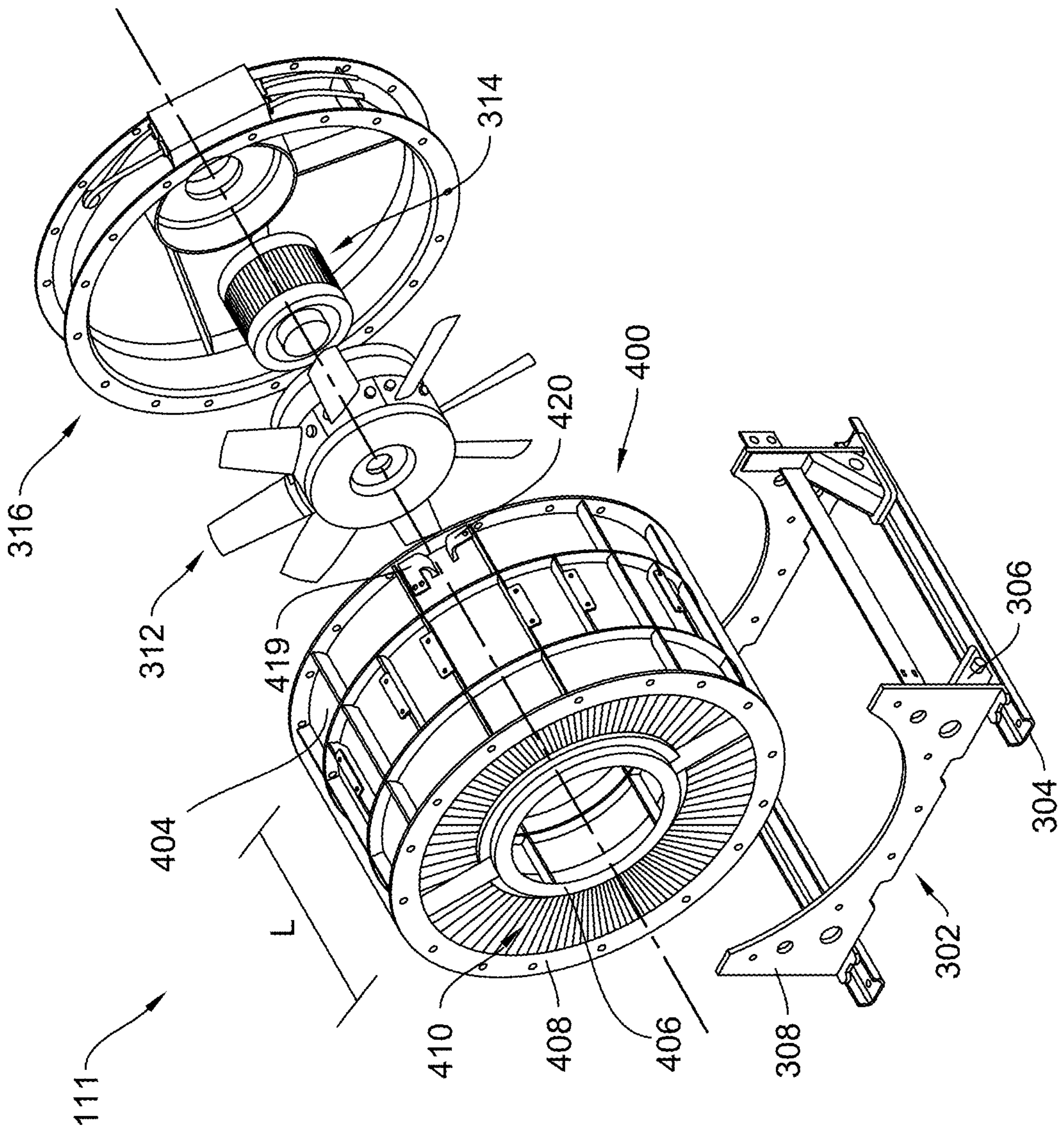
FIG. 4 illustrates an exploded view of the configuration of a modular resistor grid system of FIG. 3 and components thereof.

The dynamic braking system 200 may include the modular resistor grid system 111 disclosed herein. The modular resistor grid system 111 may dissipate some or all of the generated electric power in the form of heat. FIG. 3 illustrates a perspective view of an exemplary configuration of the modular resistor grid system 111, according to an aspect of the present disclosure. FIG. 4 illustrates an exploded view of the exemplary configuration of the modular resistor grid system 111 of FIG. 3.

Referring to FIGS. 3 and 4, the modular resistor grid system 111 includes a mount 302, a fan 310, and a modular resistor grid assembly having a "black box" resistance 400 of a plurality of modular resistor grid assemblies having a "black box" resistance. The mount 302 may be permanently or removably coupled to the machine 100. The mount 302 provides a support structure upon which the other components of the modular resistor grid system 111 may be secured, connected, and/or coupled to the dynamic braking system 200 of the machine 100. The mount 302 may include a frame 304 and one or more brackets 306. The frame 304 may include rigid supporting members such as bars, rails, posts, tracks, or other suitable elements to affix the components of the modular resistor grid system 111 to the machine 100. The frame 304 may have a first end 330 and a second end 331 defining a mount length ML therebetween. The mount length ML may be a sufficient size to allow resistor grid assemblies of varying axial lengths to interchangeably connect to the mount 302. In this way, the mount 302 may allow an operator to remove components of the modular resistor grid system 111 and exchange them with components that occupy less or greater space depending on the environment of operation. The brackets 306 may be selectively movable brackets 306 such that one or more brackets 306 can be fastened to a first position along the frame 304, loosened, allowed to slide along the length of the frame 304 to a second position, then tightened to secure the bracket 306 in the second position. In this way, the brackets 306 may accommodate and couple to modular resistor grid assemblies having a "black box" resistance 400 of varying axial length L or size. The brackets 306 may also include a mounting feature 308 configured to align or abut with the components of the modular resistor grid system 111 such that the components may be fastened together by bolts, welds, or other suitable fasteners. For example, in FIGS. 3 and 4, movable brackets 306 are coupled to mounting features 308 that are shaped to fit the cylindrical profile of the exemplary modular resistor grid system 111. By moving the brackets 306 and mounting features 308, multiple modular resistor grid assemblies having a "black box" resistance 400 of varying axial length L may be interchangeably coupled to the mount 302 by sliding and securing the movable brackets 306 as needed along the frame 304. Additionally, the movable brackets 306 may allow the fan 310 to couple at one or more locations along the mount length ML.

The modular resistor grid system 111 also includes a fan 310. The fan 310 is configured to blow cooling air through a modular resistor grid assembly having a "black box" resistance 400 in order to dissipate heat, for example, during a resistive braking mode of the machine 100. In some embodiments, the fan 310 may include a blower, a pressurized air source, a coolant delivery source, or the like. The fan 310 may include a blade assembly 312 configured to direct air towards or through the modular resistor grid assembly having a "black box" resistance 400 as the blade assembly 312 rotates. A power source 314 (e.g., a motor, battery, etc.) may power the fan 310, and a hub assembly 316 may direct air towards the modular resistor grid assembly having a "black box" resistance 400 and/or encase and protect the components of the fan 310.

The modular resistor grid system 111 includes two or more modular resistor grid assemblies having a "black box" resistance 400 (e.g., a first modular resistor grid assembly 500, a second modular resistor grid assembly 600, etc.). The modular resistor grid assembly having a "black box" resistance 400 is configured to facilitate resistive braking by receiving and dissipating power from the machine 100 in the form of heat. In some embodiments, the modular resistor grid assemblies having a "black box" resistance 400 may be formed as a single unit or may be formed from a single modular resistor grid (e.g., a single cylindrical modular resistor grid). In other embodiments, the modular resistor grid assemblies having a "black box" resistance 400 may be formed by coupling together two or more modular resistor grids (e.g., first modular resistor grid 502, second modular resistor grid 602 shown FIGS. 7 and 8, respectively, and discussed below). The modular resistor grid assemblies having a "black box" resistance 400 may include a housing 404 which may provide support to various elements of the modular resistor grid system 111. In the illustrated example of FIGS. 3-4, the housing 404 has a cylindrical shape having an inner wall 406 and an outer wall 408. The housing 404 may be in any shape and may divided into one or more modular sections. For example, the housing 404 of the modular resistor grid assembly having a "black box" resistance 400 may be formed by coupling together two or more modular resistor grids (e.g., first modular resistor grids 502, second modular resistor grids 602) each having a housing 404, 504, 604 encasing one or more resistor elements 410, 510, 610. The modular resistor grids may be cylindrical, semicylindrical, quadrant-shaped, wedge-shaped, triangular, or other suitable shapes. As illustrated in exemplary FIG. 6 and FIG. 7, the number of subsections of housing 404 and the number of individual modular resistor grids that may be coupled together to form a modular resistor grid assembly having a "black box" resistance 400 may vary depending on the space constraints of the machine 100 and the electrical and thermodynamic properties desired at a particular working environment (e.g., lower watt-density for higher altitude, smaller axial length for lower altitudes, etc.).

The modular resistor grid assemblies having a "black box" resistance 400 and their respective modular resistor grids include at least one resistor element 410 disposed between the inner wall 406 and the outer wall 408 of the housing 404. The modular resistor grid assembly having a "black box" resistance 400 and/or the modular resistor grids may include two or more resistor elements 410 (e.g., a plurality of resistor elements 410) that are closely packed in a stacked configuration abutting in an end-to-end orientation. The two or more resistor elements 410 form a conductive path between an input terminal 419 and an output terminal 420 of the modular resistor grid assembly having a "black box" resistance 400. The resistor elements 410 may be uniformly arranged in the housing 404 to maintain air spaces between each other. This uniform spacing provides for flow of cooling air between the resistor elements 410 in the modular resistor grid system 111. Moreover, one or more cooling air vents may be provided in the housing 404 for circulation of cooling air in the modular resistor grid system 111.

Exemplary Resistor Element

Figure 5:
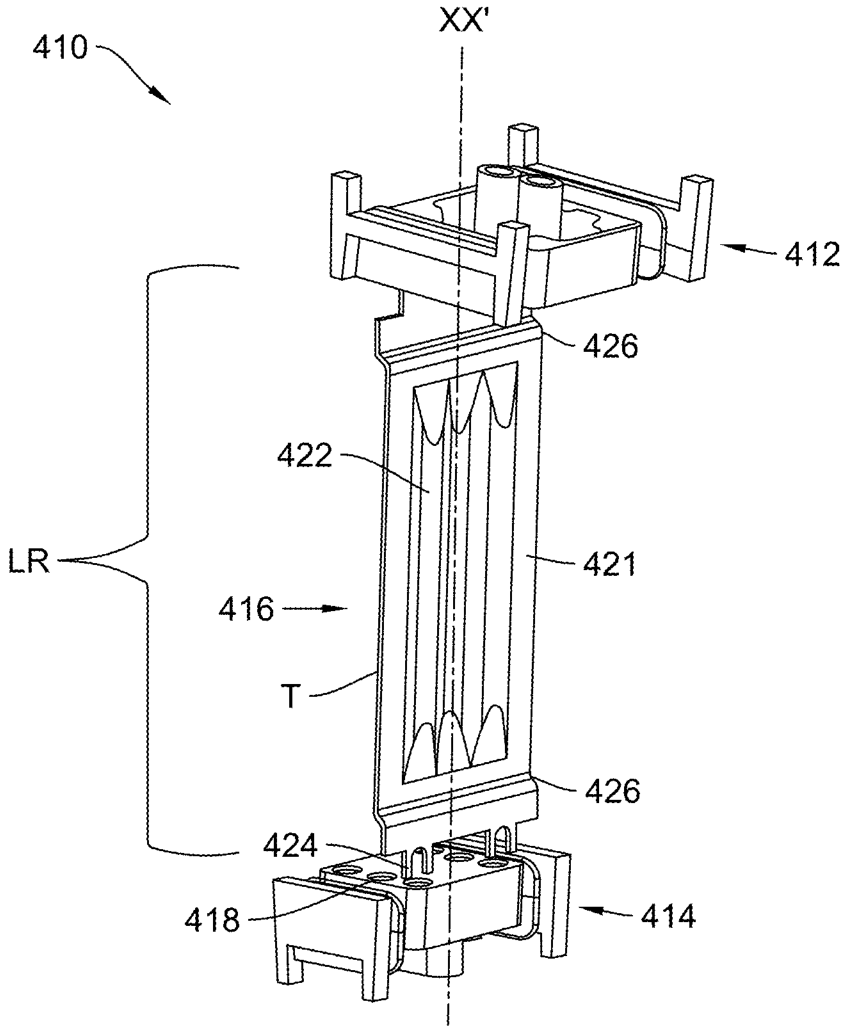
FIG. 5 illustrates a perspective view of a resistor element.

FIG. 5 illustrates an exemplary resistor element 410. The resistor element 410 includes a first insulator 412, a second insulator 414, and one or more resistor plates 416 mounted to the first insulator 412 and the second insulator 414. In the example illustrated, one resistor plate 416 is mounted between the first insulator 412 and the second insulator 414 and extends therebetween. The first insulator 412 and the second insulator 414 may be affixed to the inner wall 406 and the outer wall 408, respectively, of the housing 404 of the modular resistor grid assembly having a "black box" resistance 400 and/or the modular resistor grids thereof. One or more resistor plates 416 may be received in slots, holders, ridges, or other mounting features (e.g., apertures 418) formed in the first insulator 412 and the second insulator 414. In this way, resistor plates 416 may be connected at or near the apertures 418 to form a continuous conducting path of resistor plates 416 configured to dissipate electric energy as heat during a resistive breaking mode. Further, the one or more resistor elements 410 may be arranged in one or more rows, substantially parallel to each other in a close face-to-face relationship forming an axial airflow path therebetween. For example, multiple resistor plates 416 of multiple resistor elements 410 may be connected in series within each modular resistor grid and/or each modular resistor grid assembly having a "black box" resistance 400 to provide a continuous current path between an input terminal 419 and an output terminal 420 (See FIG. 4) of the modular resistor grid and/or the modular resistor grid assembly having a "black box" resistance 400. For this purpose, a conducting member may be disposed in the housing 404, electrically connecting the two or more resistor plates 416 in the modular resistor grid system 111. The conducting member may be a conductive wire, a weld, etc. For example, in some embodiments, the conducting member includes a seem weld between abutting portions of adjacent resistor plates 416. Additionally, conductive connectors may also be disposed between a resistor element 410 and an input terminal 419, between a resistor element 410 and an output terminal 420, and/or between the ends of two rows of resistor elements 410 to electrically connect multiple resistor plates 416 within the housing 404. The conductive connectors may include conductive (e.g., metallic) plates, switches, wires, terminals, bus bars, or other suitable electrical connectors. The resistor elements 410 may be connected in a manner such that the modular resistor grid system 111 may have two current circuits, a contactor power circuit and a chopper power circuit.

As illustrated, the first insulator 412 and the second insulator 414 may be in the shape of a block made of insulating material such as silicon bonded laminated mica, ceramic, glass reinforced material, etc. However, other suitable materials with insulating properties may be used to form the first insulator 412 and the second insulator 414. Similarly, the first insulator 412 and second insulator 414 may be formed in a variety of shapes such as blocks, blocks separated by winged or flared connectors, arcuate shapes, round, triangular, hexagonal shapes and the like. Preferably, the shape and profile of the first insulator 412 and the second insulator 414 are configured to allow air to flow freely in an axial direction relative to the housing 404 and across a large, exposed surface area of the resistor elements 410 when assembled within the housing 404. Additionally, the first insulator 412 and the second insulator 414 may be shaped to achieve a predetermined electrical property (e.g., creepage, clearance, etc.) between conductors of the modular resistor grid assembly having a "black box" resistance 400. The first insulator 412 may be affixed to the outer wall 408 of the housing 404 by some fastening member, such as, nuts and bolts, screws, etc. The second insulator 414 may be similarly fastened to the inner wall 406 of the housing 404. The first insulator 412 and the second insulator 414 may each include one or more mounting features (e.g., apertures 418) formed therein and configured to receive one or more resistor plates 416. Further, the apertures 418 may not extend entirely through the first insulator 412 or the second insulator 414 and may be configured to receive a tip portion 424 of a resistor plate 416 and mount the resistor plate 416 between the first insulator 412 and the second insulator 414.

The resistor plate 416 may be formed of a resistive material, such as stainless steel, carbon, nichrome, tungsten, ceramics, polymeric materials, graphite, semiconductors, metal oxides, photocells, resistive inks, or any other resistive material. The resistor plate may take a variety of shapes and be contoured to increase surface area exposed to air flowing through the housing 404 for thermal convection. For example, the resistor plate 416 may be a continuous strip of resistive material such as stainless steel. The resistor plate 416 may include a body portion 421 extending along a longitudinal direction XX' of the resistor plate 416. In an embodiment, the resistor plate 416 may also include a series of reflexed portions 422 disposed at opposite longitudinal sides in the body portion 421 of the resistor plate 416. In an exemplary configuration, the resistor plate 416 may extend a length, LR, of about 150 millimeters to about 200 millimeters along the longitudinal direction XX'. In a specific example, the resistor element 410 may have a length LR of about 175 millimeters. The resistor plate 416 may have a tip portion 424 disposed at an end 426 of the body portion 421. Alternatively, the resistor plate 416 may include two or more tip portions 424 disposed from both the ends 426. The tip portions 424 may include curved profiles configured to abut the tip portions 424 of an adjacent resistor plate 416 to be fastened together via a seem weld, clamp, binding, pin, cover, or the like. The tip portions 424 of the resistor plate 416 may be adapted to be received in the apertures 418 of the first insulator 412 and the second insulator 414. The apertures 418 may provide some clearance for movement of the tip portions 424 within. This allows for the resistor plate 416 to move in the longitudinal direction XX' in the resistor element 410 upon thermal expansion and thermal contraction.

The resistor plate 416 may also include a thickness, T, as shown in FIG. 5. The thickness T may be determined based on a thickness of a material sheet (e.g., stainless steel) from which the resistor plate 416 is formed. The resistor plate 416 may be formed by stamping, molding, laser cutting, water jet cutting, and the like. The resistor plates may also be formed from stainless steel, iron, metallic coils, metal alloys, or other suitable conductive materials. Various dies, molds, etc. may be utilized to form resistor plates 416 having substantially similar or identical lengths LR, profiles, and geometries that vary in thickness T. For example, a first resistor element 510 may have a length LR, a resistor plate 416 having reflexed portions 422 and tip portions 424, and a thickness T1. A second resistor element 610 may have the same length LR, may likewise have reflexed portions 422 and tip portions 424, but may have a different thickness T2 than the first insulator (e.g., if the second resistor element 610 were formed from thinner plate material). It will be appreciated that, given two resistor elements with similar or identical lengths, geometries, and profiles but varying thicknesses, the resistor element with the greater thickness will generally have less electrical resistance between its tip portions than the resistor element with the smaller thickness. In other words, the resistor element 410 and/or the resistor plate 416 may be approximated as a wire with its resistance calculated as $R=\rho(L/A)$.

During a resistive braking mode, the generated electric power may pass into the modular resistor grid system 111 via the input terminal 419. The generated electric power may flow through the resistor plates 416 in the resistor element 410 of the modular resistor grid system 111, to be dissipated as heat. Specifically, the heat is generated by the body portion 421 of the resistor plate 416. This generated heat may be radiated to the first insulator 412 and the second insulator 414 and raise the temperature of the first insulator 412 and the second insulator 414 in the resistor element 410. The normal continuous operating temperature for the first insulator 412 and the second insulator 414 may be in the range of 300 to 400 degrees Celsius, according to industry standards. For short intervals, the temperature of the first insulator 412 and the second insulator 414 may reach higher values due to surges, but if the temperature rises above a critical or maximum operating temperature for extended periods of time, the lifetime of the first insulator 412 and the second insulator 414 may be greatly reduced.

Exemplary Modular Resistor Grid Assemblies Having a "Black Box" Resistance

Figure 6:
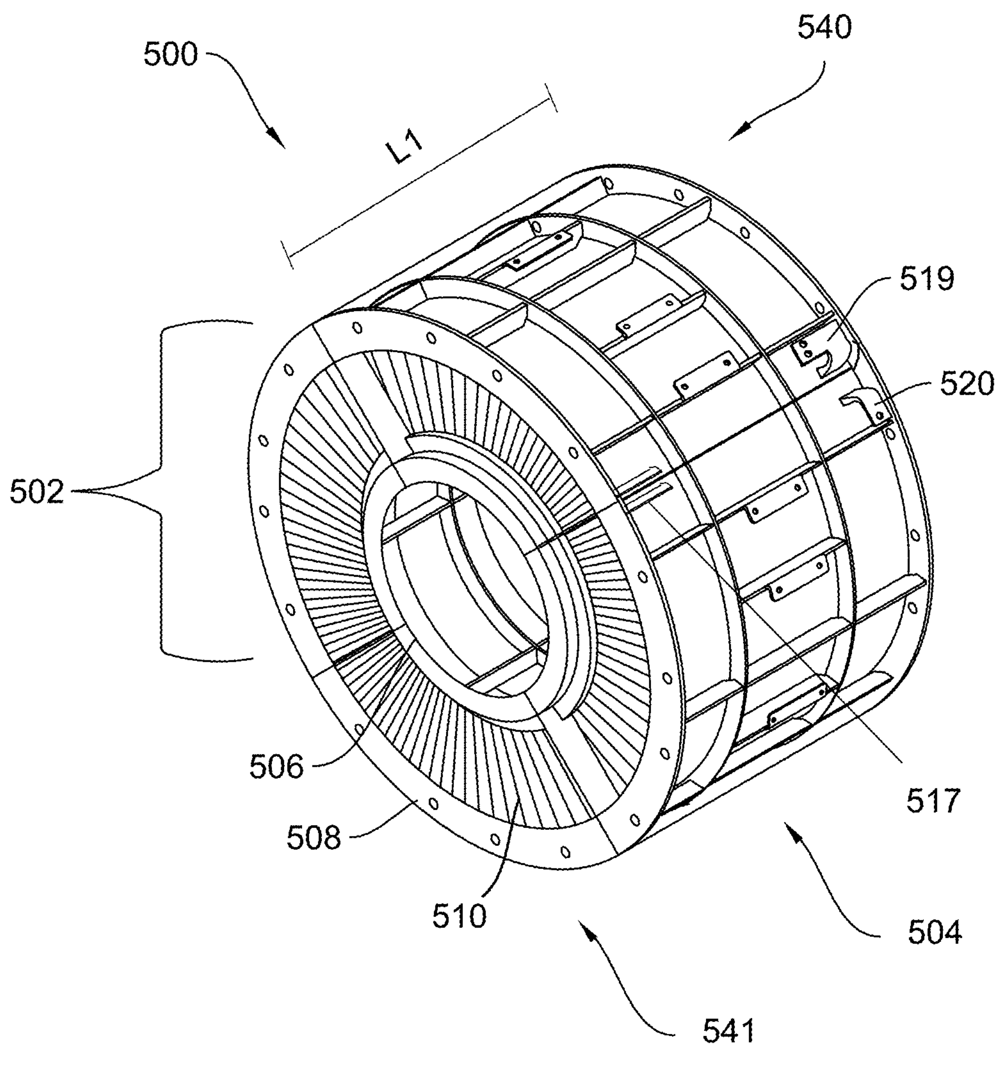
FIG. 6 illustrates a perspective view of an example first modular resistor grid assembly having a "black box" resistance of the plurality of modular resistor grid assemblies having "black box" resistances disclosed herein.
Figure 10:
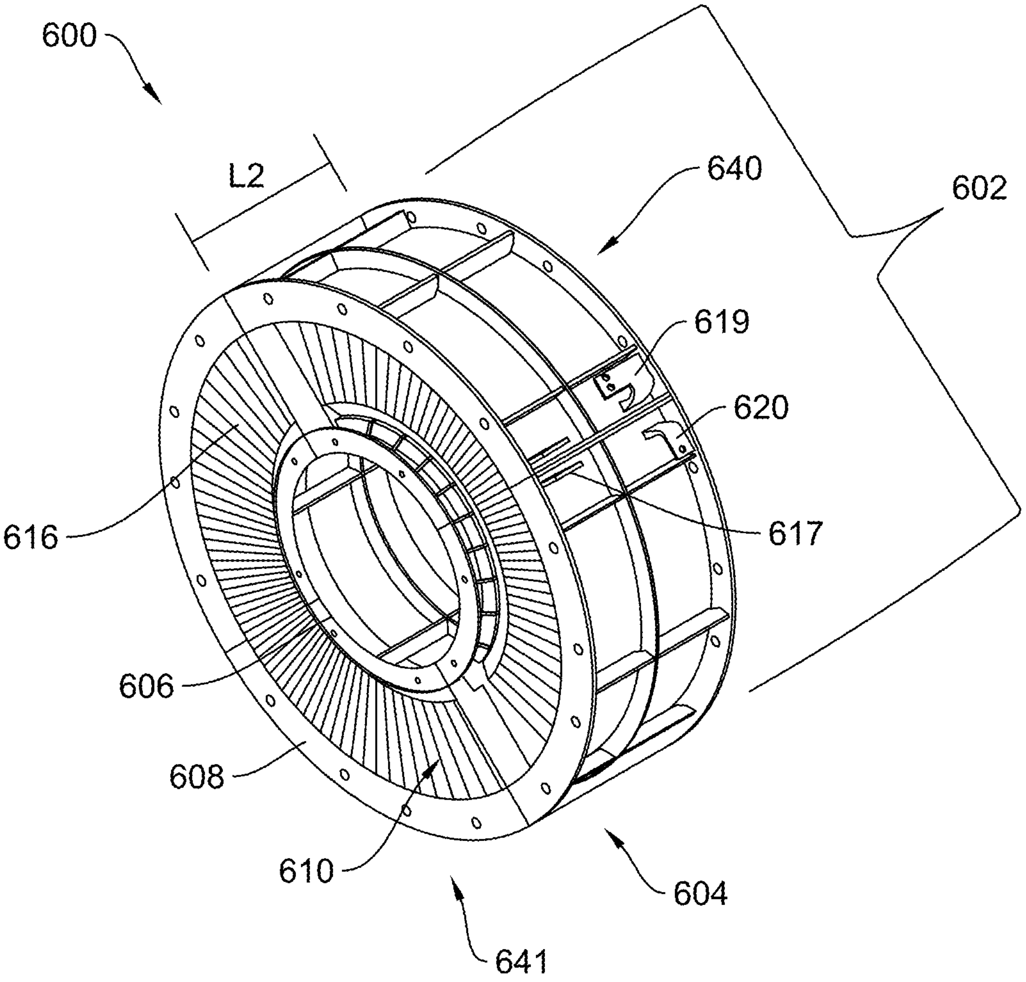
FIG. 10 illustrates a perspective view of an example second modular resistor grid assembly having a "black box" resistance of the plurality of modular resistor grid assemblies having "black box" resistances disclosed herein.

FIG. 6 illustrates an example embodiment of a first modular resistor grid assembly 500 having a "black box" resistance that is divided into four quadrant-shaped first modular resistor grids 502 (shown in FIG. 7), which are assembled with each other in the machine 100. Similarly, FIG. 10 illustrates an example embodiment of a second modular resistor grid assembly having a "black box" resistance 600 that is divided into two semicylindrical-shaped second modular resistor grids 602 (shown in FIG. 11), which are assembled with each other in the machine 100. The first modular resistor grid assembly 500 and the second modular resistor grid assembly 600 are non-limiting examples of possible modular resistor grid assemblies of the two or more modular resistor grid assemblies having a "black box" resistance 400 interchangeably operable in the modular resistor grid system 111.

Turning to FIG. 6, the first modular resistor grid assembly 500 includes a first housing 504. The first housing 504 provides a protective shell inside which the components may be securely disposed, partially shielded from debris, dust, moisture, etc. The first housing 504 includes a first inner wall 506 and a first outer wall 508 defining a space in between configured to receive the resistor elements 410 of the resistive braking system of the machine 100. For example, a plurality of first resistor elements 510 may be disposed within the first housing 504. The first housing 504 may couple to the fan 310 and/or the mounting feature 308. In this way, the first housing 504 may allow the first modular resistor grid assembly having a "black box" resistance 500 to be positioned such that cooling air from the fan 310 flows in an axial direction between an inlet 540 and an outlet 541 of the first modular resistor grid assembly having a "black box" resistance 500 and across the surface area of the multiple first resistor elements 510 within the first housing 504. The first housing 504 may also define one or more air vents or flow paths to further facilitate convective cooling of the first resistor elements 510 disposed therein.

The first housing 504 includes a first input terminal 519 and a first output terminal 520 configured to connect to a modular resistor grid system 111 and/or a resistive braking system. For example, the first housing 504 may be coupled to the mount 302 and connect to the modular resistor grid system 111. In other embodiments, the mount 302 may have additional terminals that connect to terminals of the machine 100. In such embodiments, the first input terminal 519 and the first output terminal 520 may connect to a corresponding input terminal and a corresponding output terminal of a braking system of the machine 100 (e.g., to a dynamic braking system 200 or a resistive braking system of the machine 100). The first housing 504 may also include terminals 517 shown in FIGS. 6 and 7 configured to electrically connect multiple first modular resistor grids 502 together to form the first modular resistor grid assembly having a "black box" resistance 500 such that one (in a series configuration) or more (in parallel configurations) conducting paths extend between the first input terminal 519 and the first output terminal 520. In other words, the terminals 517 electrically connect the first modular resistor grids 502 of the first modular resistor grid assembly having a "black box" resistance 500 together. In some embodiments, the terminals 517 may be connected via jumper cables, bus bars, or other suitable conductive connectors.

Figure 8:
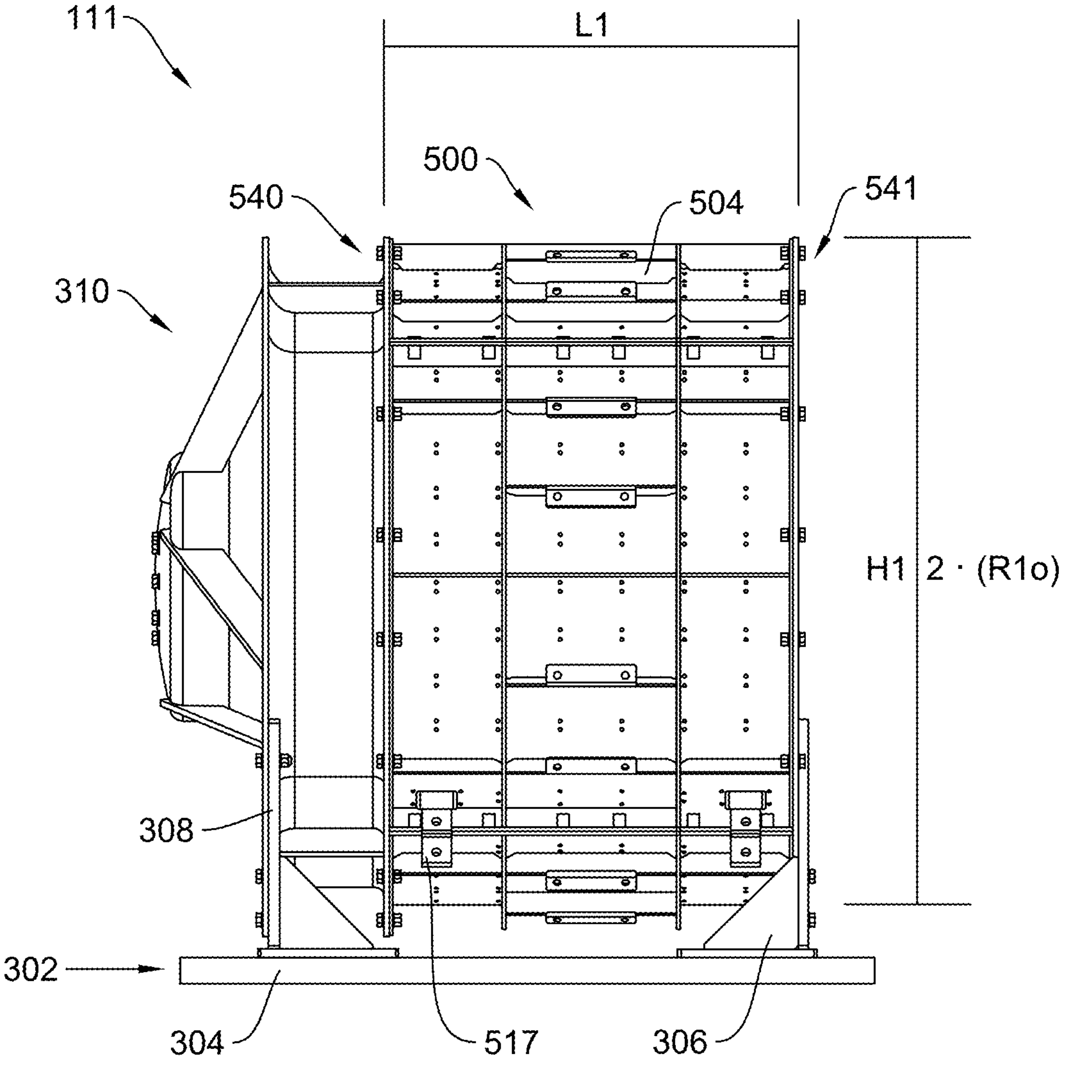
FIG. 8. illustrates a side view of the modular resistor grid system interchangeably coupled to the first modular resistor grid assembly having a "black box" resistance of FIG. 6.

The first housing 504 of the first modular resistor grid assembly having a "black box" resistance 500 may also have a first axial length L1 and a first height H1 (shown in FIG. 8). The first axial length L1 and the first height H1 define the dimensions of the first housing 504 and may determine the amount of space within the first housing 504 configured to receive the first resistor elements 510. Accordingly, a first number of first resistor elements 510 may be disposed inside the first housing 504 may be determined by the dimensions of the first housing. For example, the first number of first resistor elements 510 disposed in the first housing 504 may be between 1000-1500 first resistor elements 510. Accordingly, each of the first modular resistor grids 502 may include 250-375 first resistor elements 510. In some embodiments, the first axial length L1 may be 500 mm, 600 mm, 700 mm, 900 mm, 1100 mm, 1250 mm, 1300 mm, 1500 mm, or another suitable size. The first height H1 may fall within a similar size range.

Figure 7:
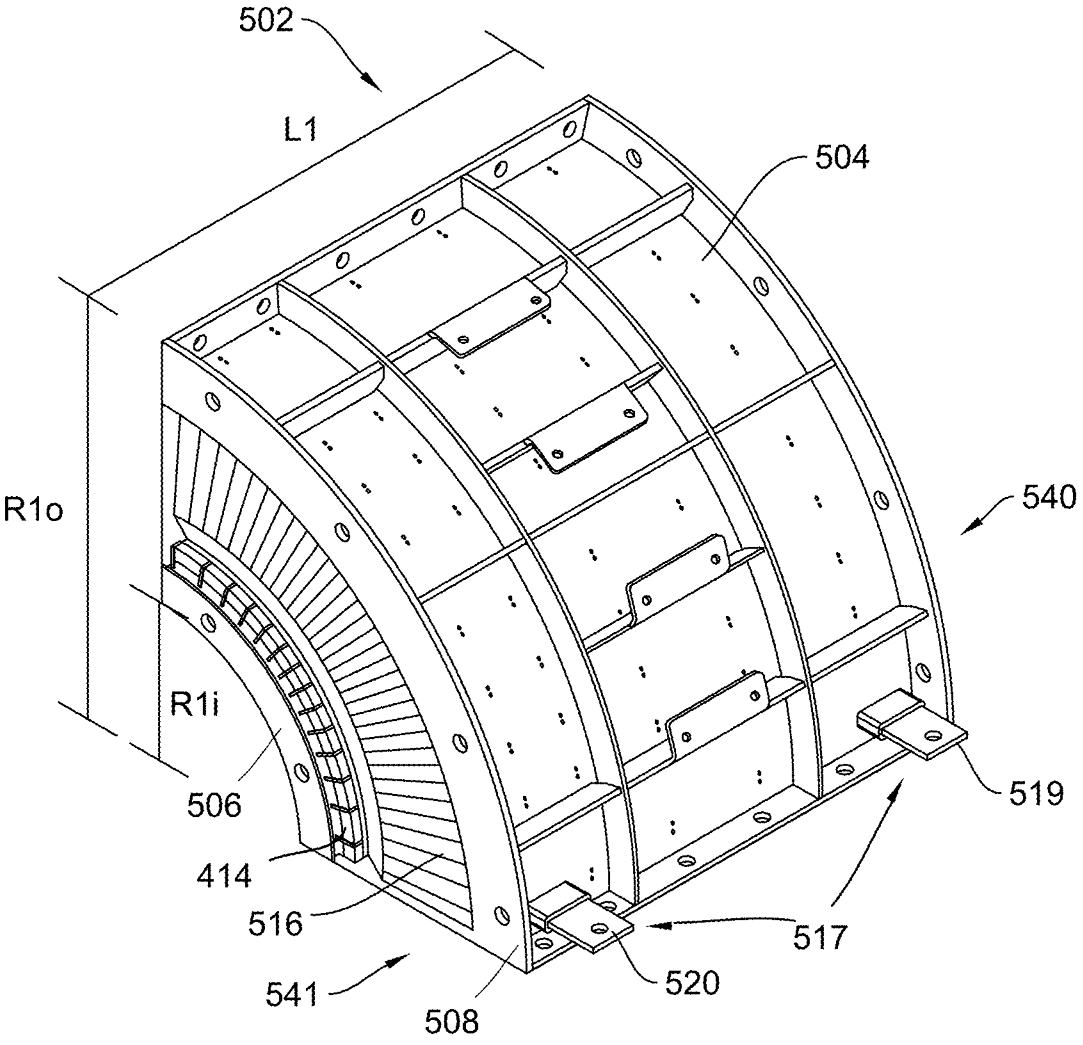
FIG. 7 illustrates a perspective view of a first example modular resistor grid of the first modular resistor grid assembly having a "black box" resistance of FIG. 6.

Accordingly, in some embodiments, the modular resistor grid system 111 may occupy a volume of space roughly 1300 mm by 1300 mm by 1250 mm. As shown in FIGS. 7 and 8, when the first modular resistor grid assembly 500 is a cylindrically shaped assembly formed from two or more first modular resistor grids 502, the first height H1 may include a first inner radius R1*i* and a first outer radius R1*o* defined by the first inner wall 506 and the first outer wall 508 of the first housing 504, respectively. In such embodiments, the first height H1 may be twice the length of the first outer radius R1*o*.

The first modular resistor grid assembly 500 includes a first plurality of first resistor elements 510 which includes a first number of first resistor elements 510. The first plurality of first resistor elements 510 and/or a first plurality of first resistor plates 516 are connected between the first input terminal 519 and the first output terminal 520. The first plurality of first resistor plates 516 may be components of the first plurality of first resistor elements 510, which may also be assembled/disposed as a first number of first resistor rows 512 within the first housing 504 of the first modular resistor grid assembly 500 (shown in FIG. 9). The first resistor elements 510 may include the similar or the same components as the resistor elements 410 and may include a first resistor plate 516 of a first thickness. The first thickness of the first resistor plate 516 corresponds to the first number of resistor plates and the configuration in which they connect the first input terminal 519 and the first output terminal 520. Specifically, by selecting a designated first thickness (and/or a first width) for each of the first resistor plates 516, a target electrical resistance can be defined between the first input terminal 519 and the first output terminal 520 (e.g., over the total length of the plurality of first resistor elements 510). The target resistance may be 3.0 Ohms, 3.5 Ohms, 4.0 Ohms, or another suitable resistance value.

Turning to FIG. 8, the first modular resistor grid assembly 500 may be interchangeably coupled to a modular resistor grid system 111. A modular resistor grid system 111 with the first modular resistor grid assembly 500 installed is illustrated from a side view. The modular resistor grid system 111 in FIG. 8 includes the mount 302 and a first modular resistor grid assembly 500 shown coupled to the mount 302 and the components thereof (e.g., the frame 304, one or more movable brackets 306, and the mounting feature 308). The plurality of first resistor elements 510 and/or the plurality of first resistor plates 516 may be configured in a number of first resistor rows 512 such that cooling air may uniformly pass over each first resistor plate 516. In some embodiments, the total surface area of the first resistor plates 516 may be between 40,000 and 50,000 $in^2$.

Figure 9:
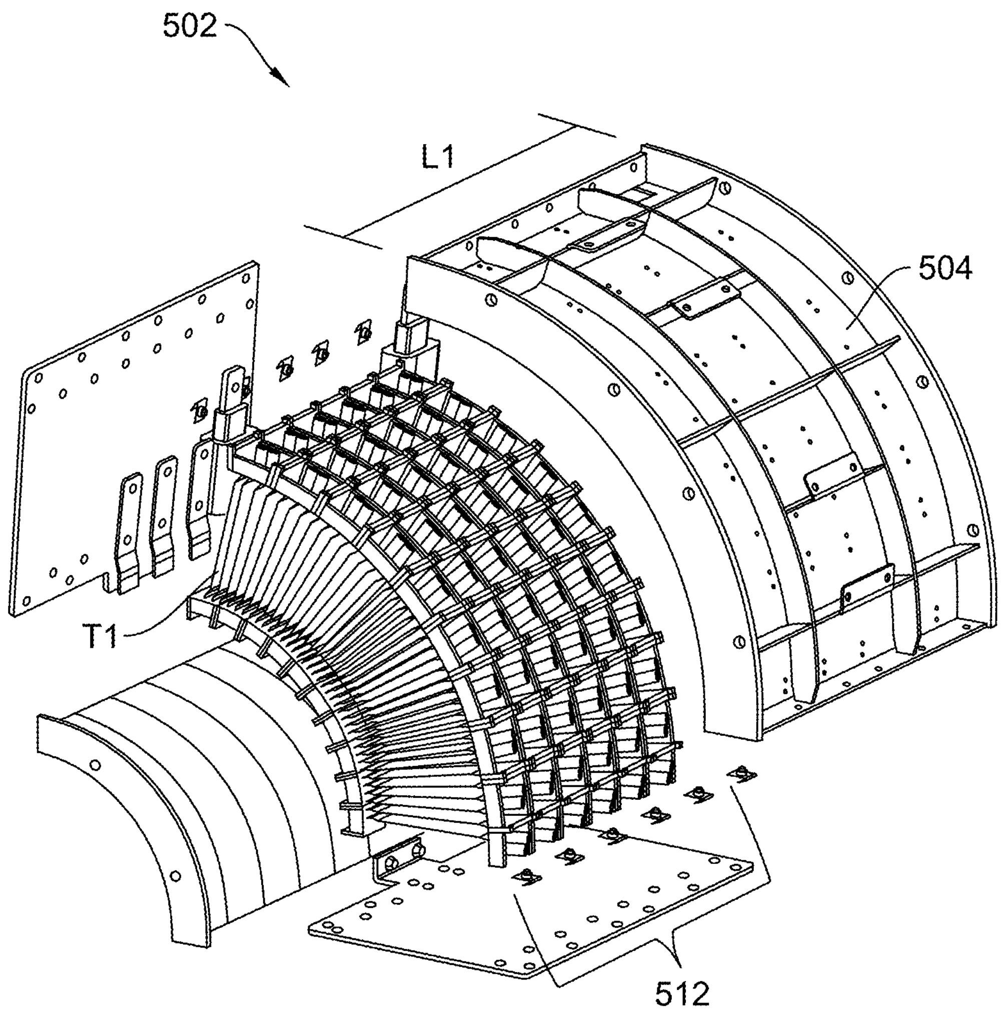
FIG. 9 illustrates an exploded view of the first example modular resistor grid of FIG. 7.

FIG. 9 illustrates an exploded view of a first modular resistor grid 502 of the first modular resistor grid assembly 500. The first housing 504 is disassembled to show the first number of first resistor rows 512 disposed within the first housing 504. Here, the first axial length L1 permits a total number of six first resistor rows 512 to fit within the first housing 504. Specifically, in certain embodiments, the first axial length L1 may be about 1000-1600 mm to permit six first resistor rows 512 to be installed in the first housing 504. Further, in this embodiment, each of the first plurality of first resistor plates 516 are connected in series between the first input terminal 519 and the first output terminal 520 via seem welds at the tip portions 424 of adjacent first resistor elements 510. As shown, in some embodiments, each of the first plurality of first resistor elements 510 and/or first resistor plates 516 extend between the first inner wall 506 and the first outer wall 508 of the first housing 504 in rows that are secured in the apertures 418 of first insulators 412 adjacent to the first outer wall 508 and second insulators 414 adjacent to the first inner wall 506, respectively. Additionally, each of the first resistor plates 516 has a first thickness T1, which may be the same for each of the first resistor plates 516 disposed within the first housing 504. The first resistor plates 516 may also have a first width that defines a first cross-sectional area at various portions of the first resistor plate 516. The first cross sectional area may vary along the length LR of the first resistor element 510.

Turning to FIG. 10, an example second modular resistor grid assembly 600 is shown. The second modular resistor grid assembly 600 includes a second housing 604 which may vary in size in some respects when compared to the first housing 504 (e.g., may vary in axial length, may vary in volume, may vary in housing surface area). In other aspects, the size of the second housing 604 may be the same or similar to the size of the first housing 504. For example, the second housing 604 may be configured to interchangeably couple to the fan 310 and/or the mounting feature 308 based on a uniform, common, predefined, or otherwise shared height or axial profile. Specifically, the second modular resistor grid assembly 600 may have a second height H2 and an axial profile (e.g., a second outer radius R2*o*, a second inner radius R2*i*, etc.) that are the same as the first height H1 and the first axial profile (e.g., the first outer radius R1*o*, the first inner radius R1*i*) of the first modular resistor grid assembly 500. In this way, both the first and second modular resistor grid assemblies having the "black box" resistance 500, 600 may be interchangeably coupled to and be configured to receive cooling air from the same fan 310 and mount to the same frame 304.

Also, like the first modular resistor grid assembly 500, cooling air may flow from the fan 310 in an axial direction between a second inlet 640 and a second outlet 641 of the second modular resistor grid assembly 600 and across the surface area of multiple resistor elements 410 (e.g., second resistor elements 610) within the second housing 604. The second housing 604 may also define one or more air vents or flow paths to further facilitate convective cooling of the second resistor elements 610 disposed therein. The second housing 604 also includes a second input terminal 619 and a second output terminal 620 which may be configured to couple to the modular resistor grid system 111 and/or to a machine 100 (e.g., to a dynamic braking system 200 or a resistive braking system of the machine 100). The terminals 617 shown in FIGS. 10-12 may be configured to electrically connect multiple second modular resistor grids 602 of the second modular resistor grid assembly 600 such that one (in series configurations) or more (in parallel configurations) conducting paths extend between the second input terminal 619 and the second output terminal 620.

Figure 11:
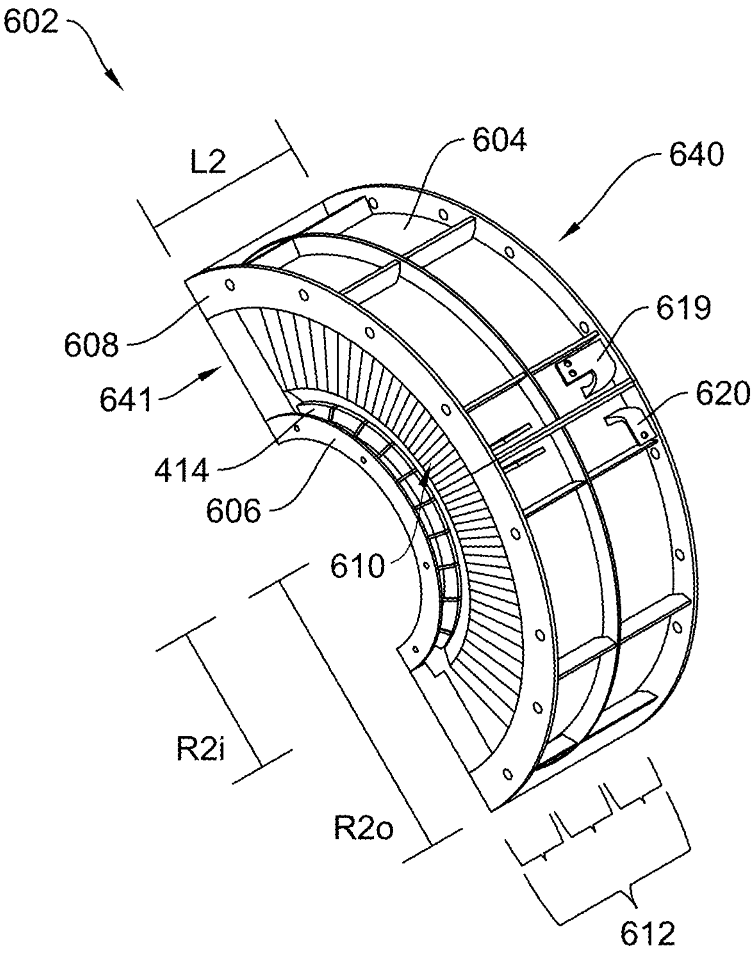
FIG. 11 illustrates a perspective view of an example modular resistor grid of the second modular resistor grid assembly having a "black box" resistance of FIG. 7.
Figure 12:
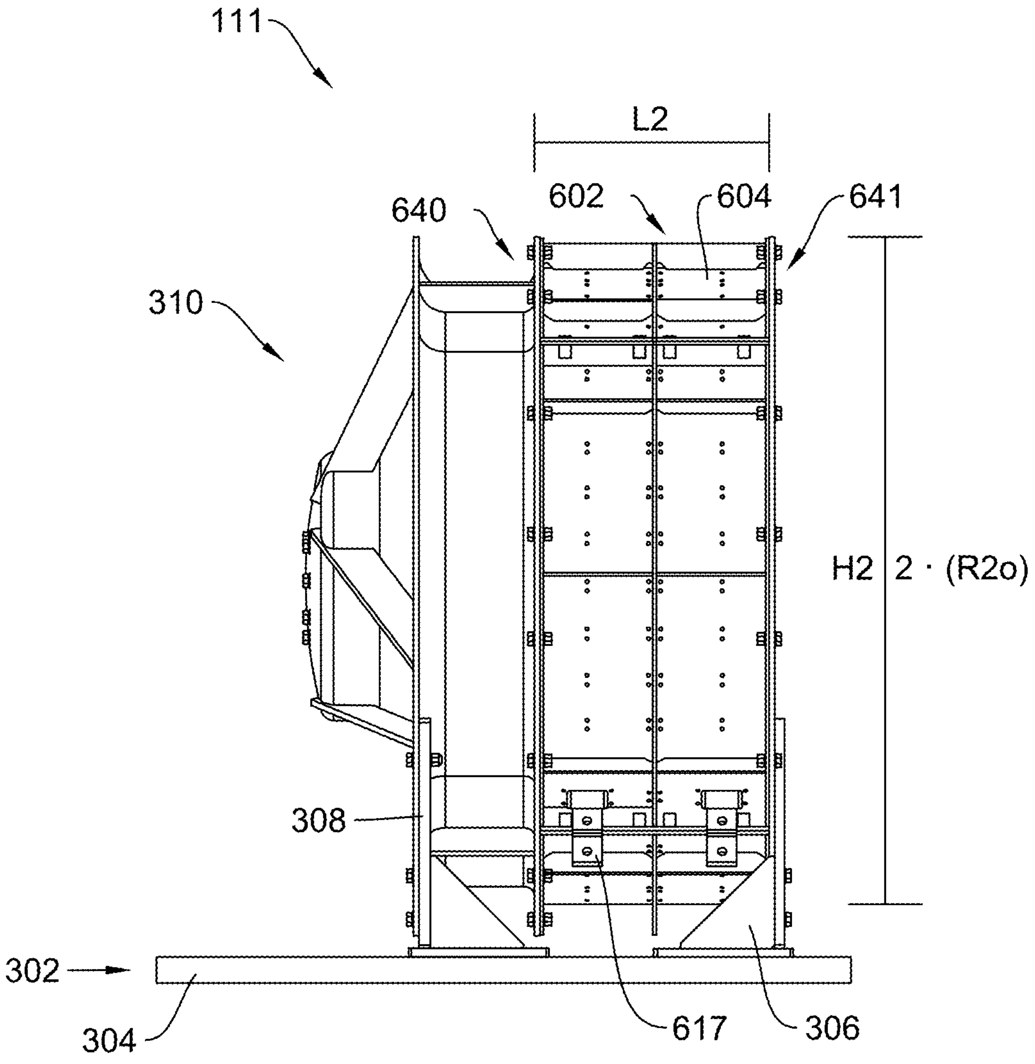
FIG. 12 illustrates a side view of the modular resistor grid system interchangeably coupled to the second modular resistor grid assembly having a "black box" resistance of FIG. 10.

Turning to FIG. 11, the second housing 604 of the second modular resistor grid assembly 600 may have a second axial length L2. Notably, as shown in FIGS. 10-12, the second axial length L2 may be shorter than the first axial length L1. In other embodiments, the second axial length L2 may be longer than the first axial length L1. The second axial length L2 and the second height H2 define the dimensions of the second housing 604 and dictate the amount of space, and thus a second number of second resistor elements 610 which may be disposed inside the second housing 604. In some embodiments, the second axial length L2 may be 350 mm, 450 mm, 550 mm, 625 mm, 650 mm, 750 mm, 850 mm, 900 mm, or another suitable size. The second height H2 may be 700 mm, 900 mm, 1100 mm, 1250 mm, 1300 mm, 1500 mm, or another suitable size (e.g., the same or a similar size to the first height H1). As shown in FIGS. 11 and 12, when the second modular resistor grid assembly 600 is a cylindrically shaped assembly formed from two or more second modular resistor grids 602 (here, two semi-cylindrical grids), the second height H2 may include a second inner radius R2*i* and a second outer radius R2*o* defined by the second inner wall 606 and the second outer wall 608 of the second housing 604, respectively.

The second modular resistor grid assembly 600 includes a second plurality of second resistor elements 610 which includes a second number of second resistor elements 610. In the embodiment shown in FIG. 10, the second number of second resistor elements 610 is less than the first number of first resistor elements 510 disposed in the first modular resistor grid assembly 500. In other embodiments (e.g., embodiments where the second housing 604 has a longer second axial length L2 than the first axial length L1) the second number of second resistor elements 610 may be larger than the first number of first resistor elements 510. The second plurality of second resistor elements 610 and/or a second plurality of second resistor plates 616 are connected between the second input terminal 619 and the second output terminal 620. The second plurality of second resistor plates 616 may be components of the second plurality of second resistor elements 610, which are formed into a second number of second resistor rows 612 (best seen as represented by three brackets indicating three second resistor rows 612 in FIG. 11) within the second housing 604 of the second modular resistor grid assembly 600. For example, in embodiments where the second axial length L2 is smaller than the first axial length L1, an exploded view of the second modular resistor grid 602 may reveal a second number of second resistor rows 612 such as two resistor rows (e.g., 1 row, 3 rows, 4 rows, a number different than the first number of first resistors rows). Specifically, in one embodiment, the second axial length L2 may be about 500-800 mm to permit three second resistor rows 612 to be installed within the second housing 604. In other embodiments where the second axial length L2 is greater than the first axial length L1, the second number of second resistor rows 612 (e.g., 7 rows, 8 rows, etc.) may be greater than the first number of first resistor rows 512 (e.g., 3 row, 4 rows, 5 rows, 6 rows). The second thickness of the second resistor plate 616 corresponds to the second number of second resistor plates 616 and the configuration in which they connect the second input terminal 619 and the second output terminal 620. Specifically, by selecting a designated second thickness (and/or a second width) for each of the second resistor plates 616, the same target electrical resistance as the target electric resistance of the first modular resistor grid assembly 500 can be defined between the second input terminal 619 and the second output terminal 620 (e.g., over the total length of the second plurality of second resistor elements 610). For the modular resistor grid assemblies having a "black box" resistance 400, 500, 600, the target resistance may be 3.0 Ohms, 3.5 Ohms, 4.0 Ohms, or another suitable resistance value.

As shown, in some embodiments, each of the second plurality of second resistor elements 610 and/or second resistor plates 616 extend between the second inner wall 606 and the second outer wall 608 of the second housing 604. Each of the second resistor plates 616 has a second thickness T2, which may be the same for each of the second resistor plates 616 disposed within the second housing 604. The second resistor plates 616 and/or the second resistor elements 610 may also have a second width, which together with the second thickness T2, defines a second cross sectional area. The second cross sectional area may differ from the first cross sectional area. However, the total length of the second plurality of second resistor elements 616 may correspond to the second cross sectional area such that the target resistance between the second input terminal 619 and the second output terminal 620 is the same as the target resistance between the first input terminal 519 and the first output terminal 520.

Turning to FIG. 12, a second configuration of the modular resistor grid system 111 is illustrated from a side view. The modular resistor grid system 111 in FIG. 12 includes the mount 302 and the second modular resistor grid assembly 600 shown interchangeably coupled to the mount 302 and the components thereof (e.g., the frame 304, one or more movable brackets 306, and the mounting feature 308).

The modular resistor grid system 111 may have a target electrical resistance defined between the input terminal 619 and the output terminal 620. In this way, when the modular resistor grid system 111 is coupled to a machine 100, electric current may flow from the input terminal 619 to the output terminal 620 and the modular resistor grid system 111 may dissipate power as heat. Notably, the plurality of modular resistor grid assemblies having a "black box" resistance 400 (e.g., the first modular resistor grid assembly 500, the second modular resistor grid assembly 600, other modular resistor grid assemblies of varying shapes/sizes having the "black box" resistance and configured to interchangeably couple to the modular resistor grid system 111) may all have the same target resistance between their respective input terminals 419, 519, 619, etc. and output terminals 420, 520, 620, etc.

Specifically, the thickness and/or width of the respective resistor elements 410 within each modular resistor grid assembly 400 may be varied/designated to achieve a uniform target resistance for each of the plurality of modular resistor grid assemblies 400. In this way, the plurality of modular resistor grid assemblies 400 have a "black box" resistance such that-despite the differing size, thermodynamic properties, weight, and spatial profiles of the modular resistor grid assemblies—from an electrical systems perspective each may be viewed as a "black box" having the same resistance and thus be readily interchangeable in a resistive braking system of a machine 100. In this regard, each modular resistor grid assembly 400-600 may each have "black box" resistances which are uniform, despite having different sizes, thermodynamic properties, material compositions, etc.

For example, the first modular resistor grid assembly 500 (FIG. 6) with a first axial length of L1 may have a first number of first resistor rows 512 (e.g., 6 rows) that total a first number of first resistor plates 516 (e.g., 1000-1500 first resistor plates) connected in series between the first input terminal 519 and the first output terminal 520. Also, for example, the second modular resistor grid assembly 600 (FIG. 10) with a shorter second axial length of L2 may have a second number of second resistor rows 612 (e.g., 3 rows) totaling a second number of second resistor plates 616 (e.g., 500-800 second resistor plates) connected in series between the second input terminal 619 and the second output terminal 620. Because the first axial length L1 is larger than the second axial length L2, there is more space/volume within the first housing 504 than in the second housing 604. Accordingly, the first number of first resistor plates 516 in the first plurality of first resistor plates 516 may be greater than the second number of second resistor plates 616 in the second plurality of second resistor plates 616. Similarly, the first number of first resistor rows 512 may be greater than the second number of second resistor rows 612. In other words, the total length of the conductive path between the first input terminal 519 and the first output terminal 520 may be larger than the total length of the conductive path between the second input terminal 619 and the second output terminal 620.

In order to maintain the same target electrical resistance between the input terminals 519, 619 and the output terminals 520, 620 of the first and second modular resistor grid assembly 500, 600, the first thickness T1 (and/or first width) of the first resistor plates 516 and the second thickness T2 (and/or the second width) of the second resistor plates 616 may differ. Specifically, the first thickness T1 of the first plurality of first resistor plates 516 may be larger than the second thickness T2 of the second plurality of second resistor plates 616. Similarly, the first widths and/or second widths (e.g., the cross-sectional area of the respective resistor plates) may be varied to maintain a set resistance given the conducting path disposed in each resistor grid assembly. In this way, the target resistance between each input terminal 419, 519, 619 and output terminal 420, 520, 620 of a respective modular resistor grid assembly 400, 500, 600 may be 3.0 Ohms. In other embodiments, the target resistance may be 1.0 Ohms, 2.0 Ohms, between 3.5 Ohms and 3.8 Ohms, 4.0 Ohms, or other suitable resistance values.

By varying the size of each modular resistor grid assembly 400 and the thicknesses of the resistor plates 416 within each respective modular resistor grid assembly 400, the capacity to dissipate power associated with each modular resistor grid assembly having a "black box resistance" may remain uniform while the watt-density of each of the plurality of modular resistor grid assemblies having a "black box" may vary from one assembly to another. For example, a modular resistor grid system 111 may include the first modular resistor grid assembly 500 and be configured to dissipate 1 MW of power with a watt-density of approximately 20 watts/inch$^2$. The first modular resistor grid having a "black box" resistance may be removed and replaced by the second modular resistor grid assembly 600. With the second modular resistor grid assembly 600, the modular resistor grid system 111 may then be configured to dissipate 1 MW of power with a watt-density of approximately 40 watts/inch$^2$. In some embodiments, the watt density of the modular resistor grid system 111 may vary between 10 watts/inch$^2$ and 60 watts/inch$^2$ based on the particular modular resistor grid assembly having a "black box" resistance 400 installed/coupled to the modular resistor grid system 111.

Because the first modular resistor grid assembly 500 and the second modular resistor grid assembly 600 may be interchangeably coupled to the modular resistor grid system 111, an operator may selectively install or interchange the active modular resistor grid assembly depending on the environment in which the machine 100 is operating. This interchangeability beneficially allows the selection of optimized thermodynamic, electrical, and spatial properties tailored to current operating conditions. For example, the first modular resistor grid assembly 500, having a relatively low watt-density and relatively large surface area for heat convection, may be referred to as a "high-altitude" assembly. At high altitudes where air density is lower and mass flow rate of cooling air decreases for fan assemblies when compared to low altitude conditions, installing the first modular resistor grid assembly 500 increases the likelihood that the modular resistor grid system 111 receives cooling air over a sufficient surface area to operate at maximum resistive breaking capacity. Conversely, the second modular resistor grid assembly 600, having a relatively high watt-density and smaller surface area for heat convection, may be referred to as a "low-altitude" assembly. At low altitudes where air density increases and mass flow rate of cooling air is greater for fan assemblies when compared to high altitude conditions, less surface area for cooling may be required to operate at maximum resistive breaking capacity and mass/space can be saved by installing a modular resistor grid assembly with a smaller size (e.g., smaller axial length). Table 1 below demonstrates an example of the variety an operator may be presented with when choosing which modular resistor grid assembly having a "black box" resistance 400 to install:

TABLE 1

| Resistor Element Rows | Housing Axial Length (mm) | Resistor Plate Thickness (mm) | Modular Resistor Grid Assembly Mass (kg) | Modular Resistor Grid Assembly Watt-Density (watts/inch$^2$) | Modular Resistor Grid Assembly Power Dissipation (MW) |
|---|---|---|---|---|---|
| 6 | 1200 | 1.20 | 480 | 20 | 1.0 |
| 4 | 900 | 0.73 | 227 | 36.7 | 1.0 |
| 3 | 750 | 0.50 | 100 | 45 | 1.0 |

Beneficially, a particular grid may be chosen to maintain full resistive breaking capacity at a specific location, while also optimizing the mass and spatial requirements of the modular resistor grid installed. These benefits may be achieved with common tooling and manufacturing processes and minimum changes (e.g., changes to thickness, width, cross sectional area of the resistor elements, changes to axial length of housing size, etc.) to overall resistor grid architecture.

While the modular resistor grid assemblies having a "black box" resistance 400, 500, 600, may be interchangeably coupled to the modular resistor grid system 111, the modular resistor grid system 111 may be configured to dissipate a predetermined amount of power as heat during the resistive breaking mode regardless of which modular resistor grid assembly 400, 500, 600 is installed. For example, the modular resistor grid system 111 may be configured to have a continuous power capacity of about 100 KW, 250 KW, 500 KW, 750 KW, 1 MW, 2 MW, 5 MW, 6 MW, 7 MW, 8 MW, 9 MW, 9.5 MW, or 10 MW. In other embodiments, the modular resistor grid system 111 has a continuous capacity of about 10 MW or greater. In some embodiments, the modular resistor grid system 111 has a continuous power capacity of about 500 kW to about 2 MW.

Figure 13:
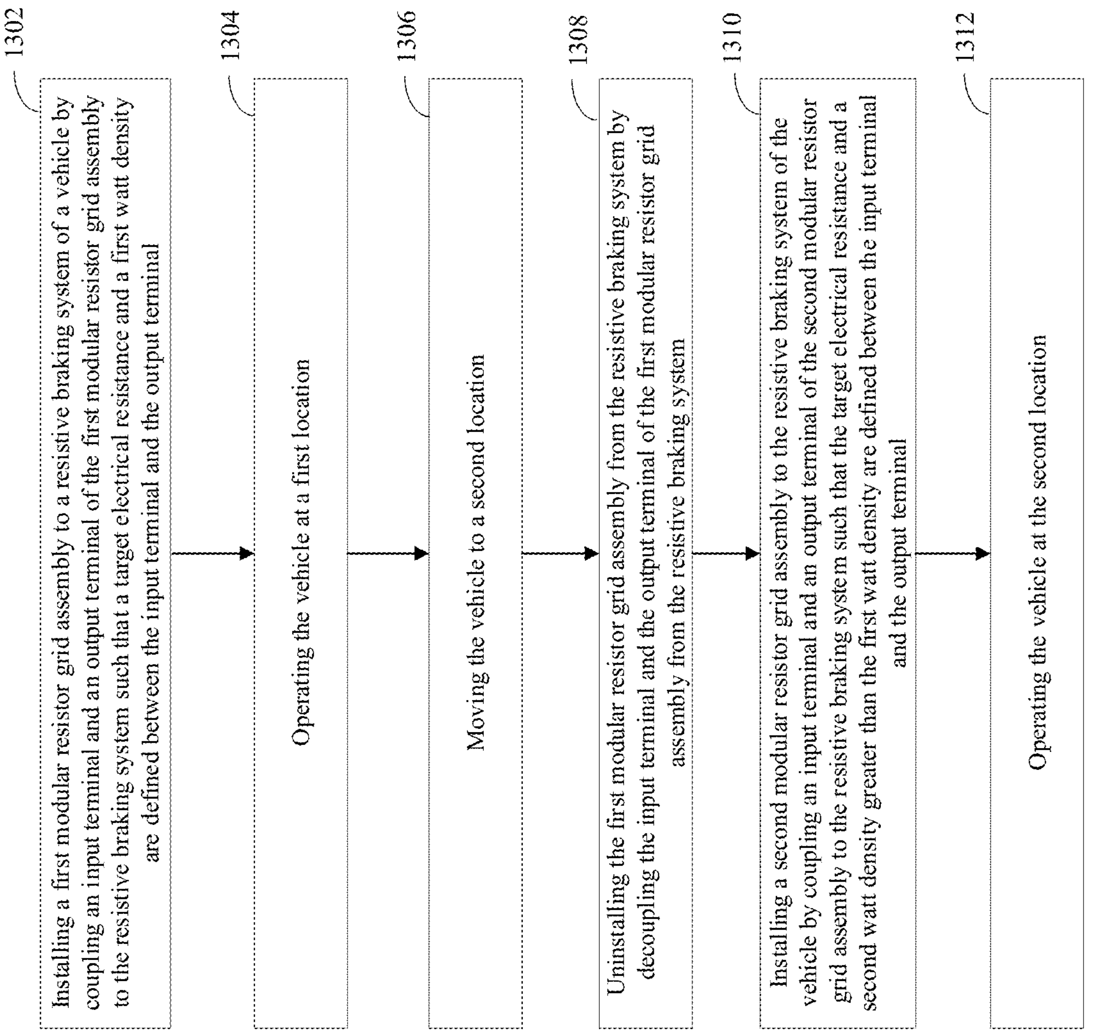
FIG. 13 illustrates a flow chart for a method of utilizing a modular resistor grid assembly having a "black box" resistance with a modular resistor grid system.

Exemplary Method of Using Modular Resistor Grid Assemblies Having a "Black Box" Resistance FIG. 13 illustrates exemplary steps of a method of utilizing the modular resistor grid assemblies having a "black box" resistance 400 described above with a modular resistor grid system 111. These steps may be performed in a different order than the exemplary order shown in FIG. 13. Additionally, steps may be repeated, separated by optional steps or intervening steps, or expanded upon to include additional actions. All such iterations of the operating process as would be apparent to a person of ordinary skill in the art are contemplated within this disclosure.

At step 1302, the method includes installing a first modular resistor grid assembly 500 (e.g., a first modular resistor grid assembly 500 having a "black box" resistance) to a resistive braking system of a machine 100 by coupling an input terminal (e.g., input terminal 519) and an output terminal (e.g., output terminal 520) of the first modular resistor grid assembly to the resistive braking system such that a target electrical resistance and a first watt density are defined between the input terminal and the output terminal. At this step, a machine 100 may include a modular resistor grid system 111 having a modular resistor grid assembly or a resistor grid previously/already installed. In this case, the installed resistor grid may be removed, and an operator may select an appropriate first modular resistor grid assembly 500 based on the conditions of the operating environment. Alternatively, the modular resistor grid system 111 may have no resistor grid installed. The machine 100 may have a designated first location of operation. For example, the machine 100 may be deployed to a mining site at a high altitude (e.g., 3000 meters above sea level, 5000 meters above sea level, etc.). At the high-altitude first location, the air density is much lower than air density at sea level, meaning that a fan 310 of the modular resistor grid system 111 will provide a lower mass flow rate of cooling air. Accordingly, a first modular resistor grid assembly 500 may be selected based on its properties that are advantageous for use at the high-altitude first location. For example, the first modular resistor grid having a "black box" resistance 500 as shown in FIG. 6 has a larger surface area of resistor plates available for convective cooling (e.g., when compared to a modular resistor grid assembly having only three rows of resistor plates) and may more readily dissipate heat in the high-altitude environment despite the reduced mass flow rate of cooling air.

Accordingly, at this step, the first modular resistor grid assembly 500 may be chosen and installed on the resistive braking system of the machine 100. As shown in FIGS. 2 and 8, installation may occur by mounting the first modular resistor grid to a mount 302 of the modular resistor grid system 111, to the machine 100, etc. The first input terminal 519 and the first output terminal 520 are coupled a circuit of the resistive braking system, allowing the machine 100 to brake and adjust its speed by dissipating energy as heat via the modular resistor grid system 111. Additionally, at this step, the first modular resistor grid assembly 500 has a first number of first resistor plates 516 of the plurality of first resistor plates 516 disposed and/or located in the first housing 504. The first number may define the total length of the conductive path for the first modular resistor grid assembly 500. In light of the total length, the density of the first resistor plate 516 material, and the cross-sectional area of each plate, the plurality of first resistor plates 516 have a first thickness T1 (and/or a first width) which achieves a target resistance between the input terminal 519 and the output terminal 520 of the first modular resistor grid assembly 500. For example, in a particular embodiment, a first number of first resistor plates 516 may be provided to fill six rows in the first housing 504, the rows may include approximately 50 resistor plates in each row and connected in series between the input terminal 519 and output terminal 520. By disposing the first resistor elements 510 in the first housing 504, the modular resistor grid assembly 500 may achieve a target resistance approximately between 3.1 and 3.8 Ohms and be configured to dissipate 1 MW of power while utilized in the resistive braking system. The first thickness may be about 1.12 mm for each of the first resistor plates 516. The first modular resistor grid assembly 500 may also include a first axial length L1 (e.g., about 600 mm, 700 mm, 900 mm, 1100 mm, 1250 mm, 1300 mm, 1500 mm, etc.) of the first housing 504 to encase and house the first number of first resistor elements 510. Given the surface area and size of the "high-altitude" resistor grid assembly, the first modular resistor grid assembly may have a first watt density of less than 25 Watts/in$^2$.

At step 1304, the method includes operating the machine 100 at the first location. At this step, the machine 100 operates and preforms restive braking via the modular resistor grid system 111 having the first modular resistor grid assembly 500 installed. In this way, power is dissipated via the first modular resistor grid assembly 500 and cooling air is directed through the inlet 540 and out of the outlet 541 to cool the first modular resistor grid assembly 500 during operation.

At step 1306, the method includes moving the machine 100 to a second location. At this step, the machine 100 may be transported, reassigned, etc. and change its location of operation. For example, the second location may be a mining site at or below sea level (e.g., a "low altitude" location). At the low altitude second location, the air density is higher than the air density at the high-altitude location and thus the fan 310 provides a greater mass flow rate of cooling air.

The change in the air density and other environmental or operating conditions may prompt step 1308, uninstalling the first modular resistor grid assembly from the resistive braking system by decoupling the input terminal and the output terminal of the first modular resistor grid assembly from the resistive braking system. For example, at the low altitude second location, the first modular resistor grid assembly 500 having a larger first axial length L1 and a relatively large surface area for heat convection (e.g., when compared to a modular resistor grid having only 2, 3, 4, etc. rows) may not be optimized for the low altitude location. Specifically, the first modular resistor grid assembly 500 may take up excessive space and add additional weight/mass to the machine 100 than a smaller modular resistor grid assembly that would provide the sufficient cooling at the low altitude location and the same power dissipation of 1 MW. To reduce the mass of the machine 100 and increase the available space, the first modular resistor grid assembly 500 may be decoupled from the input terminal and output terminal of the resistive braking system and removed from the machine 100.

At step 1310, the method includes installing a second modular resistor grid assembly to the resistive braking system of the machine by coupling an input terminal and an output terminal of the second modular resistor grid assembly to the resistive braking system such that the target electrical resistance and a second watt density greater than the first watt density are defined between the input terminal and the output terminal. In other embodiments, such as when a machine 100 operates at a low altitude first location and is moved to a high altitude second location, this step may include coupling an input terminal and an output terminal of the second modular resistor grid assembly to the resistive braking system such that the target electrical resistance and a second watt density less than the first watt density are defined between the input terminal and the output terminal.

In embodiments where the machine 100 is moved from a high altitude first location to a low altitude second location, the second modular resistor grid assembly 600 may be chosen and installed on the resistive braking system of the machine 100. Installation may occur in a similar manner to that of the first modular resistor assembly 500. The second input terminal 619 and the second output terminal 620 are coupled a circuit of the resistive braking system, allowing the machine 100 to brake and adjust its speed by dissipating energy as heat via the modular resistor grid system 111. Additionally, at this step, the second modular resistor grid assembly 600 has a second number of second resistor plates 616 of the plurality of second resistor plates 616 disposed and/or located in the second housing 604. The second number may define the total length of the conductive path for the second modular resistor grid assembly 600. In light of the total length, the density of the second resistor plate 616 material, and the cross-sectional area of each plate, the plurality of second resistor plates 616 has a second thickness T2 (and/or a second width) which achieves the target resistance between the input terminal 619 and the output terminal 620 of the second modular resistor grid assembly 600. For example, in the embodiment where a machine 100 moves from a high-altitude location to a low altitude location, the second number of second resistor plates 616 may be smaller than the first number of first resistor plates 516. Additionally, the second thickness T2 and/or the second width may be smaller than the first thickness T1 and/or the first width. The second number of second resistor plates 616 may be provided to fill, for example, three rows in the second housing 604, the rows may include approximately 50-100 resistor plates in each row and connected in series between the input terminal 619 and output terminal 620. By disposing the second resistor elements 610 in the second housing 604, the second modular resistor grid assembly 600 may achieve a target resistance approximately between 3.1 and 3.8 Ohms and be configured to dissipate 1 MW of power while utilized in the resistive braking system. The second thickness may be about 0.56 mm for each of the second resistor plates 616. The second modular resistor grid assembly 600 may also include a second axial length L2 less than the first axial length L1 (e.g., about 400 mm, 500 mm, 800 mm, etc.) of the first housing 504 to encase and house the second number of second resistor elements 610. Given the lower surface area and size of the "low altitude" resistor grid assembly compared to the "high altitude" resistor grid assembly, the second modular resistor grid assembly may have a second watt density greater than the first watt density. For example, the watt density of the second modular resistor grid assembly 600 may be greater than 30 Watts/in$^2$.

At step 1312, the method includes operating the vehicle at the second location. At this step, the machine 100 operates and preforms restive braking via the modular resistor grid system 111 having the second modular resistor grid assembly 600 installed. In this way, power is dissipated via the second modular resistor grid assembly 600 and cooling air is directed through the second inlet 640 and out of the second outlet 641 to cool the second modular resistor grid assembly 600 during operation. Notably, when moving from a high altitude to a low altitude, the second resistor grid assembly 600 may have a higher watt density and thus take up less space, have less mass, and have less surface air for heat convection than the first modular resistor grid assembly

500. However, given the increase in air density and increase in the mass flow rate of cooling air generated by the same fan 310, the modular resistor grid system 111 may still operate to dissipate 1 MW of power while the temperature is managed to prevent thermal degradation of the components thereof. Accordingly, a plurality of modular resistor grid assemblies having a "black box" resistance 400 may be manufactured and selected for use based on the location of the machine 100. In embodiments where a machine 100 begins in a low altitude location and moves to a high-altitude location, the second modular resistor grid assembly 600 may be installed first and replaced with the first modular resistor grid assembly 500 (e.g., installing the second modular resistor grid assembly results in an increased axial length, mass, surface area for convection, resistor thickness, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various exemplary embodiments is illustrative only. Additionally, any element disclosed in one embodiment may be incorporated or utilized with any other embodiment disclosed herein.

What is claimed is:

1. A modular resistor grid assembly, the modular resistor grid assembly comprising:

an input terminal and an output terminal;

a first plurality of resistor grids configured to couple together, to connect the input terminal to the output terminal, and to provide a target electrical resistance between the input terminal and the output terminal, each of the first plurality of resistor grids comprising:

a first housing, a first plurality of resistor plates disposed within the first housing, each of the first plurality of resistor plates having a first thickness;

a second plurality of resistor grids configured to couple together, to connect the input terminal to the output terminal, and to provide the target electrical resistance between the input terminal and the output terminal, each of the second plurality of resistor grids comprising:

a second housing, a second plurality of resistor plates disposed within the second housing, each of the second plurality of resistor plates having a second thickness;

wherein:

the first plurality of resistor grids and the second plurality of resistor grids are configured to interchangeably connect to the input terminal and the output terminal, and the first thickness is greater than the second thickness.

2. The modular resistor grid assembly of claim 1, wherein, each of the first plurality of resistor plates are connected in series within the first housing, and each of the second plurality of resistor plates are connected in series within the second housing.

3. The modular resistor grid assembly of claim 1, wherein the first plurality of resistor plates forms a first number of resistor rows connected within the first housing, the second plurality of resistor plates forms a second number of resistor rows connected within the second housing, and the first number of resistor rows is greater than the second number of resistor rows.

4. The modular resistor grid assembly of claim 1, wherein the first housing has a first axial length, and the second housing has a second axial length less than the first axial length.

5. The modular resistor grid assembly of claim 1, wherein the first plurality of resistor grids is further configured to create a first watt density between the input terminal and the output terminal, the second plurality of resistor grids is further configured to create a second watt density between the input terminal and the output terminal greater than the first watt density.

6. The modular resistor grid assembly of claim 5, wherein the first watt density is less than 25 Watts/$in^2$ and the second watt density is greater than 30 Watts/$in^2$.

7. The modular resistor grid assembly of claim 5, wherein the first watt density is 21 Watts/$in^2$ and the second watt density is 42.3 Watts/$in^2$.

8. A modular resistor grid assembly, the modular resistor grid assembly comprising:

a first plurality of resistor plates disposed within a first housing having a first input terminal and a first output terminal, each of the first plurality of resistor plates having a first thickness, the first plurality of resistor plates configured to provide a target electrical resistance between the first input terminal and the first output terminal;

a second plurality of resistor plates disposed within a second housing having a second input terminal and a second output terminal, each of the second plurality of resistor plates having a second thickness, the second plurality of resistor plates configured to provide the target electrical resistance between the second input terminal and the second output terminal;

wherein:

the first housing and the second housing are configured interchangeably couple to a resistive braking system, the first plurality of resistor plates includes a first number of resistor plates, the second plurality of resistor plates includes a second number of resistor plates less than the first number of resistor plates, and the first thickness is greater than the second thickness.

9. The modular resistor grid assembly of claim 8, wherein the first plurality of resistor plates and the second plurality of resistor plates are configured to connect in series between the respective input terminal and the respective output terminal.

10. The modular resistor grid assembly of claim 8, wherein:

the first plurality of resistor plates is configured to form a first number of resistor rows connected between the first input terminal and the first output terminal;

the second plurality of resistor plates is configured to form a second number of resistor rows connected between the second input terminal and the second output terminal; and wherein:

the first number of resistor rows is greater than the second number of resistor rows.

11. The modular resistor grid assembly of claim 8, wherein:

the first plurality of resistor plates is configured to create a first watt density between the first input terminal and the first output terminal;

the second plurality of resistor plates is configured to create a second watt density between the second input terminal and the second output terminal; and wherein:

the first watt density is smaller than the second watt density.

12. The modular resistor grid assembly of claim 11, wherein the first watt density is less than 25 Watts/$in^2$ and the second watt density is greater than 30 Watts/$in^2$.

13. The modular resistor grid assembly of claim 11, wherein the first watt density is 21 Watts/$in^2$ and the second watt density is 42.3 Watts/$in^2$.

14. A method of using a modular resistor grid assembly, the method comprising:

installing a first modular resistor grid assembly to a resistive braking system of a vehicle by coupling an input terminal and an output terminal of the first modular resistor grid assembly to the resistive braking system such that a target electrical resistance and a first watt density are defined between the input terminal and the output terminal;

operating the vehicle at a first location;

moving the vehicle to a second location;

uninstalling the first modular resistor grid assembly from the resistive braking system by decoupling the input terminal and the output terminal of the first modular resistor grid assembly from the resistive braking system;

installing a second modular resistor grid assembly to the resistive braking system of the vehicle by coupling an input terminal and an output terminal of the second modular resistor grid assembly to the resistive braking system such that the target electrical resistance and a second watt density greater than the first watt density are defined between the input terminal and the output terminal; and operating the vehicle at the second location.

15. The method of claim 14, wherein:

the first location is a high-altitude location; and the second location is a low-altitude location.

16. The method of claim 14, further comprising:

disposing a first number of resistor plates within the first modular resistor grid assembly to connect the input terminal to the output terminal; and disposing a second number of resistor plates within the second modular resistor grid assembly to connect the input terminal to the output terminal such that the second number of resistor plates is less than the first number of resistor plates.

17. The method of claim 16, further comprising:

providing a first thickness to each of the first number of resistor plates; and providing a second thickness to each of the second number of resistor plates such that the first thickness is greater than the second thickness.

18. The method of claim 16, further comprising:

connecting the first number of resistor plates in series between the input terminal and the output terminal of the first modular resistor grid assembly; and connecting the second number of resistor plates in series between the input terminal and the output terminal of the second modular resistor grid assembly.

19. The method of claim 14 further comprising:

providing a first housing with a first axial length around the first modular resistor grid assembly; and providing a second housing with a second axial length less than the first axial length around the second modular resistor grid assembly.

20. The method of claim 14, wherein the first watt density is less than 25 Watts/in$^2$ and the second watt density is greater than 30 Watts/in$^2$.

* * * * *